(12) United States Patent
Shintani et al.

(10) Patent No.: US 8,229,845 B2
(45) Date of Patent: Jul. 24, 2012

(54) WITHDRAWAL PROCESSING APPARATUS AND WITHDRAWAL PROCESSING METHOD

(75) Inventors: Hidekazu Shintani, Chiba (JP); Nobuki Iio, Tokyo (JP); Shoji Ohyama, Tokyo (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 610 days.

(21) Appl. No.: 12/383,611

(22) Filed: Mar. 27, 2009

(65) Prior Publication Data
US 2009/0248562 A1  Oct. 1, 2009

(30) Foreign Application Priority Data
Mar. 28, 2008 (JP) ................ P2008-086010

(51) Int. Cl.
*G06Q 40/00* (2012.01)
(52) U.S. Cl. .......................... 705/39; 705/35
(58) Field of Classification Search .............. 705/35
See application file for complete search history.

(56) References Cited

U.S. PATENT DOCUMENTS
7,792,717 B1 * 9/2010 Hankins et al. ............ 705/35
2002/0038292 A1 * 3/2002 Quelene ...................... 705/80

FOREIGN PATENT DOCUMENTS
| JP | 2001-229247 | | 8/2001 |
| JP | 2003-006403 | A | 1/2003 |
| JP | 2003-346219 | A | 12/2003 |
| JP | 2004-086376 | A | 3/2004 |
| JP | 2007-052636 | A | 3/2007 |
| WO | WO 0177929 | A1 * | 10/2001 |

* cited by examiner

*Primary Examiner* — William Rankins
(74) *Attorney, Agent, or Firm* — Lerner, David, Littenberg, Krumholz & Mentlik, LLP

(57) ABSTRACT

A withdrawal processing apparatus is arranged with a storage unit for storing deposit balances of respective yen account and foreign currency account; an acquiring unit for acquiring withdrawal request information including a withdrawal amount for every currency; a withdrawal judgment unit for judging, for every currency, whether or not the withdrawal amount is within a range of a deposit balance; and a withdrawal processing unit for performing a withdrawal process based on the withdrawal amount of yen for the yen account if judged that the withdrawal amount of yen is within the range of the deposit balance of the yen account, where the withdrawal processing unit compensates the shortage amount from the yen account and performs the withdrawal process when the shortage amount with respect to the withdrawal amount of the foreign currency of the foreign currency account is within the range of the deposit balance of the yen account.

4 Claims, 19 Drawing Sheets

FIG.6

EXAMPLE OF STAGE DETERMINATION TABLE

| STAGE 1 | DEPOSIT BALANCE OF GREATER THAN OR EQUAL TO 1,000,000 YEN AND LESS THAN 3,000,000 YEN |
|---|---|
| STAGE 2 | DEPOSIT BALANCE OF GREATER THAN OR EQUAL TO 3,000,000 YEN |
| OUTSIDE STAGE | DEPOSIT BALANCE OF LESS THAN 1,000,000 YEN |

FIG.7

| CURRENCY | | CURRENCY EXCHANGE COST IN SELLING | SELLING RATE (TTB) | REFERENCE RATE (TTM) | BUYING RATE (TTS) | CURRENCY EXCHANGE COST IN BUYING | UNIT |
|---|---|---|---|---|---|---|---|
| US DOLLAR | 1USD = | 0.25 | 107.53 | 107.78 | 108.03 | 0.25 | YEN |
| EURO | 1EUR = | 0.25 | 157.96 | 158.21 | 158.46 | 0.25 | YEN |

CURRENCY EXCHANGE RATE OF CUSTOMER OF STAGE 1 (REDUCE CURRENCY EXCHANGE COST IN SELLING AND BUYING)

| CURRENCY | | CURRENCY EXCHANGE COST IN SELLING | SELLING RATE (TTB) | REFERENCE RATE (TTM) | BUYING RATE (TTS) | CURRENCY EXCHANGE COST IN BUYING | UNIT |
|---|---|---|---|---|---|---|---|
| US DOLLAR | 1USD = | 0.20 | 107.58 | 107.78 | 107.98 | 0.20 | YEN |
| EURO | 1EUR = | 0.20 | 158.01 | 158.21 | 158.41 | 0.20 | YEN |

CURRENCY EXCHANGE RATE OF CUSTOMER OF STAGE 2 (REDUCE CURRENCY EXCHANGE COST IN SELLING AND BUYING)

| CURRENCY | | CURRENCY EXCHANGE COST IN SELLING | SELLING RATE (TTB) | REFERENCE RATE (TTM) | BUYING RATE (TTS) | CURRENCY EXCHANGE COST IN BUYING | UNIT |
|---|---|---|---|---|---|---|---|
| US DOLLAR | 1USD = | 0.10 | 107.68 | 107.78 | 107.88 | 0.10 | YEN |
| EURO | 1EUR = | 0.10 | 158.11 | 158.21 | 158.31 | 0.10 | YEN |

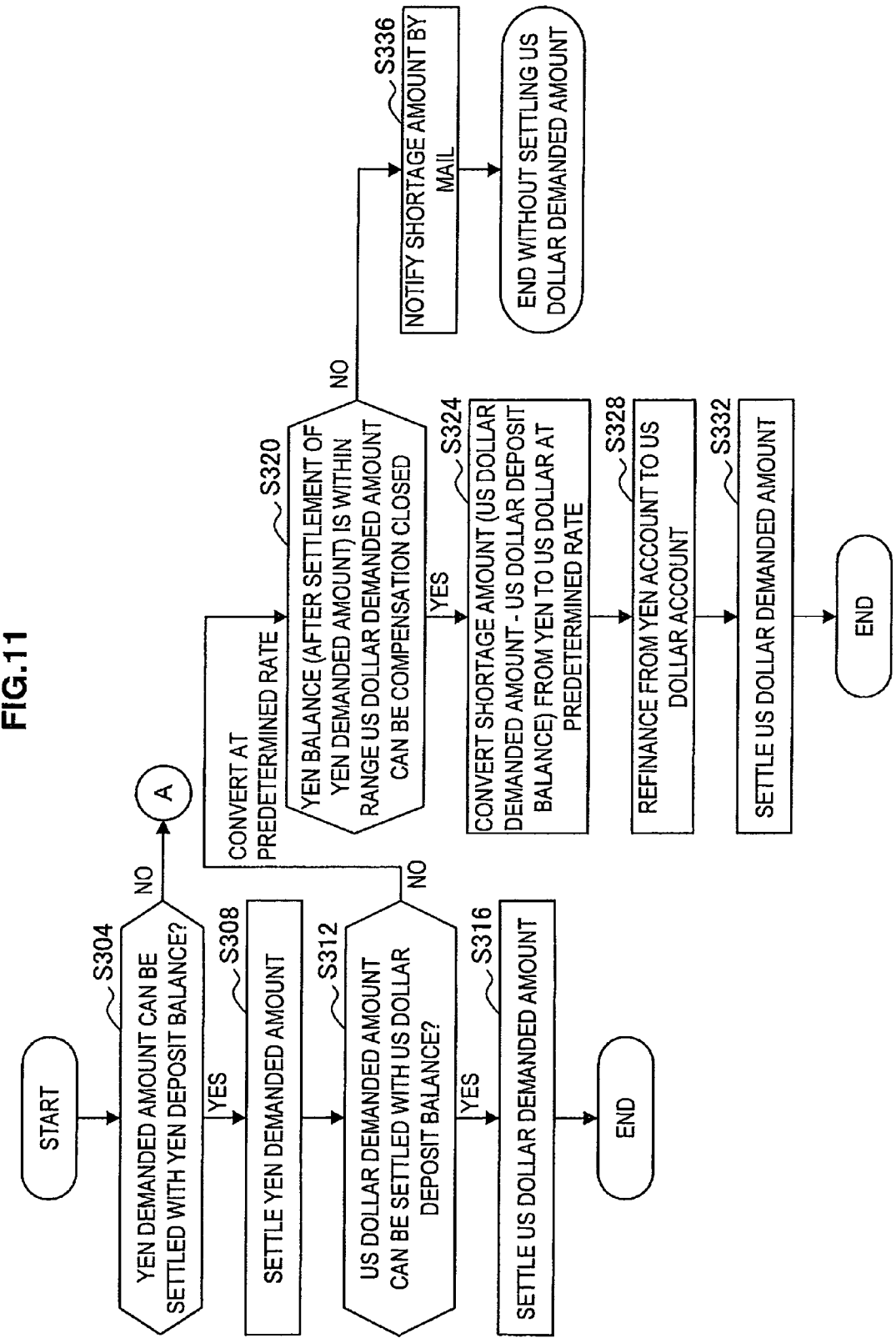

FIG.15

| SETTLEMENT CURRENCY PRIORITY TABLE | |
|---|---|
| ¥ | 3 |
| $ | 1 |
| € | 2 |

| COMPENSATION CURRENCY PRIORITY TABLE | |
|---|---|
| ¥ | 1 |
| $ | 2 |
| € | 3 |

FIG.16A

| DEPOSIT BALANCE BEFORE USE | USAGE DEMANDED AMOUNT | DEPOSIT BALANCE AFTER SETTLEMENT |
|---|---|---|
| ¥ 1,000,000 YEN | ¥ 2,750,000 YEN | ¥ 0 YEN |
| $ 10,000 US DOLLAR | $ 0 US DOLLAR | $ 0 US DOLLAR |
| € 10,000 EURO | € 0 EURO | € 5,000 EURO |

FIG.16B

| DEPOSIT BALANCE BEFORE USE | USAGE DEMANDED AMOUNT | DEPOSIT BALANCE AFTER SETTLEMENT |
|---|---|---|
| ¥ 1,000,000 YEN | ¥ 0 YEN | ¥ 0 YEN |
| $ 10,000 US DOLLAR | $ 24,500 US DOLLAR | $ 0 US DOLLAR |
| € 10,000 EURO | € 15,000 EURO | € 7,000 EURO |

FIG.16C

| DEPOSIT BALANCE BEFORE USE | USAGE DEMANDED AMOUNT | DEPOSIT BALANCE AFTER SETTLEMENT |
|---|---|---|
| ¥ 1,000,000 YEN | ¥ 500,000 YEN | ¥ 0 YEN |
| $ 10,000 US DOLLAR | $ 19,500 US DOLLAR | $ 0 US DOLLAR |
| € 10,000 EURO | € 0 EURO | € 7,000 EURO |

WITHDRAWAL PROCESSING APPARATUS AND WITHDRAWAL PROCESSING METHOD

CROSS REFERENCES TO RELATED APPLICATIONS

The present application claims priority from Japanese Patent Application No. JP 2008-086010, filed in the Japanese Patent Office on Mar. 28, 2008, the entire content of which is incorporated herein by reference.

BACKGROUND OF THE INVENTION

1. Field of the Invention

The present invention relates to a withdrawal processing apparatus and a withdrawal processing method.

2. Description of the Related Art

In recent years, provision of services using the Internet is being more widely implemented by the service providers with widespread use of the Internet. For instance, as represented by a net-bank, financial services such as deposit management and asset management are also being provided to customers through the Internet.

In particular, the financial service providers have been attempting to develop a unique service to position oneself apart from the competitors. For instance, Japanese Patent Application Laid-Open No. 2001-229247 describes a settlement system of withdrawing the usage amount of a credit card from a foreign currency account instead of a home currency account when a customer having a foreign current account uses the credit card in a foreign country and has not made a foreign currency payment. When withdrawing the usage amount of the credit card in a foreign country from the home currency account, the customer bears the conversion cost caused between the foreign currency and the home currency. The above settlement system is, however, beneficial for the customers in that the cost to be paid by the customer can be reduced.

SUMMARY OF THE INVENTION

However, in the settlement system of the related art, the usage amount of the credit card is processed as not settled if the deposit balance of the foreign currency account is short with respect to the usage amount of the credit card. As a result, a case where the customers are forced to bear the burden due to shortage in balance of the savings account of the currency to be settled such as arise of late charge of the settlement is assumed.

The present invention addresses the above-identified and other issues associated with the devices in related art and methods, and it is desirable to provide a novel and improved withdrawal processing apparatus and a withdrawal processing method capable of suppressing the case where the customers are forced to bear the burden due to shortage in balance of the savings account of the currency to be settled.

According to an embodiment of the present invention, there is provided a withdrawal processing apparatus including a storage unit for storing a deposit balance for every account of a plurality of types of currencies and first priority data and second priority data indicating priority of the plurality of types of currencies; an acquiring unit for acquiring withdrawal request information including a withdrawal amount of every currency; a withdrawal judgment unit for judging, for every currency, whether or not the withdrawal amount in the withdrawal request information is within a range of a deposit balance of an account of every currency; a withdrawal processing unit for performing a withdrawal process based on the withdrawal amount for the account in which the withdrawal amount is judged as within the range of the deposit balance by the withdrawal judgment unit; a selecting unit for selecting a currency with highest priority according to the first priority data of the currencies in which the withdrawal amount is judged as outside the range of the deposit balance by the withdrawal judgment unit; and a compensation judgment unit for judging whether or not a shortage amount with respect to the withdrawal amount of a currency account selected by the selecting unit is within a range of a deposit balance of a currency account selected based on the second priority data, wherein the withdrawal processing unit compensates the shortage amount based on a judgment result of the compensation judgment unit and performs the withdrawal process of the withdrawal amount.

In such configuration, even if the withdrawal amount related to a certain currency is outside the range of the deposit balance of the account corresponding to the relevant currency, the shortage amount is compensated from another currency account according to the second priority data. As a result, a case where the withdrawal related to the currency is not settled can be suppressed.

The withdrawal processing unit may compensate the shortage amount from the currency account of highest priority and perform the withdrawal process if judged by the compensation judgment unit that the shortage amount is within the range of the deposit balance of the currency account with highest priority based on the second priority data.

The compensation judgment unit may select a currency of next highest priority based on the second priority data if judged that the shortage amount is outside the range of the deposit balance of the currency account with the highest priority based on the second priority data, and judge whether or not the shortage amount is within a range of a total amount of the deposit balance of the currency account with the highest priority and the deposit balance of the currency account with the next highest priority; and the withdrawal processing unit may compensate the total amount of the deposit balance of the currency account with the highest priority and at least one part of the deposit balance of the currency account with the next highest priority and perform the withdrawal process of the shortage amount if judged by the compensation judgment unit that the shortage amount is within the range of the total amount.

The storage unit may store a currency rate for mutually converting the plurality of types of currencies set based on the total amount of the deposit balance for every account of the plurality of types of currencies for every customer having accounts of the plurality of types of currencies, and the compensation judgment unit may read out from the storage unit the currency rate for converting from a currency selected based on the second priority data to a currency in which the shortage amount arose, and judge whether or not the shortage amount is within the range of the converted currency balance in which the currency rate is applied to the deposit balance of the currency account selected based on the second priority data.

In order to solve the above issue, according to another embodiment of the present invention, there is provided a withdrawal processing method including the steps of: recording a deposit balance for every account of a plurality of types of currencies and first priority data and second priority data indicating priority of the a plurality of types of currencies; acquiring withdrawal request information including a withdrawal amount for every currency; judging, for every currency, whether or not the withdrawal amount in the withdrawal request information is within a range of a deposit balance of an account of every currency; performing a withdrawal process based on the withdrawal amount for the account in which the withdrawal amount is judged as within the range of the deposit balance; selecting a currency with highest priority according to the first priority data of the currencies in which the withdrawal amount is judged as outside the range of the deposit balance; judging whether or not a shortage amount with respect to the withdrawal amount of a selected currency account is within the range of a deposit balance of a currency account selected based on the second priority data; and compensating the shortage amount based on a judgment result of whether or not within the range and performing the withdrawal process of the withdrawal amount.

According to another embodiment of the present invention, there is provided a withdrawal processing apparatus including a storage unit for storing a deposit balance of a yen account and a deposit balance of a foreign currency account; an acquiring unit for acquiring withdrawal request information including a withdrawal amount for every currency; a withdrawal judgment unit for judging, for every currency, whether or not the withdrawal amount in the withdrawal request information is within a range of the deposit balance of every currency; a yen compensation judgment unit for judging whether or not a shortage amount of the deposit balance of the foreign currency account with respect to the withdrawal amount of the foreign currency is within a range of the deposit balance of the yen account if judged by the judgment unit that the withdrawal amounts of yen and foreign currency are outside the range of the respective deposit balance of the yen account and the foreign currency account; and a foreign currency withdrawal processing unit for compensating the shortage amount from the yen account and performing a withdrawal process if judged by the yen compensation judgment unit that the shortage amount of the foreign currency account is within the range of the deposit balance of the yen account.

The withdrawal processing apparatus may further include a foreign currency compensation judgment unit for judging whether or not a shortage amount of the deposit balance of the yen account with respect to the withdrawal amount of yen is within a range of the deposit balance of the foreign currency account if judged by the yen compensation unit that the shortage amount of the foreign currency account is outside the range of the deposit balance of the yen account; and a yen withdrawal processing unit for compensating the shortage amount from the foreign currency account and performing a withdrawal process if judged by the foreign currency compensation judgment unit that the shortage amount of the yen account is within the range of the deposit balance of the foreign currency account.

According to another embodiment of the present invention, there is provided a withdrawal processing method including the steps of: acquiring withdrawal request information including a withdrawal amount for every currency; judging whether or not a withdrawal amount of yen in the withdrawal request information is within a range of a deposit balance of a yen account, and whether or not a withdrawal amount of a foreign currency is within a range of a deposit balance of a foreign currency account; judging whether or not the shortage amount of the deposit balance of the foreign currency account with respect to the withdrawal amount of the foreign currency is within a range of the deposit balance of the yen account if judged that the withdrawal amounts of yen and foreign currency are outside the respective range of the deposit balance of the yen account and the foreign currency account; and compensating the shortage amount from the yen account and performing a withdrawal process if judged that the shortage amount of the foreign currency account is within the range of the deposit balance of the yen account.

According to another embodiment of the present invention, there is provided a withdrawal processing apparatus including a storage unit for storing a deposit balance of a US dollar account and a deposit balance of a foreign currency account; an acquiring unit for acquiring withdrawal request information including a withdrawal amount for every currency; a withdrawal judgment unit for judging, for every currency, whether or not the withdrawal amount in the withdrawal request information is within a range of a deposit balance of every currency; a US dollar compensation judgment unit for judging whether or not the shortage amount of the deposit balance of the foreign currency account with respect to the withdrawal amount of the foreign currency is within a range of the deposit balance of the US dollar account if judged by the judgment unit that the withdrawal amounts of US dollar and foreign currency are outside the respective range of the deposit balance of the US dollar account and the foreign currency account; and a foreign currency withdrawal processing unit for compensating the shortage amount from the US dollar account and performing a withdrawal process if judged by the US dollar compensation judgment unit that the shortage amount of the foreign currency account is within the range of the deposit balance of the US dollar account.

According to another embodiment of the present invention, there is provided a withdrawal processing apparatus including a storage unit for storing a deposit balance of a euro account and a deposit balance of a foreign currency account; an acquiring unit for acquiring withdrawal request information including a withdrawal amount for every currency; a withdrawal judgment unit for judging, for every currency, whether or not the withdrawal amount in the withdrawal request information is within a range of a deposit balance of every currency; a euro compensation judgment unit for judging whether or not the shortage amount of the deposit balance of the foreign currency account with respect to the withdrawal amount of the foreign currency is within a range of the deposit balance of the euro account if judged by the judgment unit that the withdrawal amounts of euro and foreign currency are outside the respective range of the deposit balance of the euro account and the foreign currency account; and a foreign currency withdrawal processing unit for compensating the shortage amount from the euro account and performing a withdrawal process if judged by the euro compensation judgment unit that the shortage amount of the foreign currency account is within the range of the deposit balance of the euro account.

According to the embodiments of the present invention described above, a case where the customers are forced to bear the burden due to shortage in balance of the savings account of the currency to be settled can be suppressed.

BRIEF DESCRIPTION OF THE DRAWINGS

FIG. 6 is an explanatory view showing one example of a stage determination table;

FIG. 7 is an explanatory view showing a relationship between a customer stage and a currency exchange cost;

FIG. 11 is a flowchart showing a flow of the settlement process of the bank server according to the first embodiment;

FIG. 15 is an explanatory view showing a specific example of a settlement currency priority table (first priority data) and a compensation currency priority table (second priority data);

FIG. 16A is an explanatory view showing a specific example of the settlement process in the second embodiment;

FIG. 16B is an explanatory view showing a specific example of the settlement process in the second embodiment;

FIG. 16C is an explanatory view showing a specific example of the settlement process in the second embodiment.

DETAILED DESCRIPTION OF THE PREFERRED EMBODIMENTS

Figure 1:
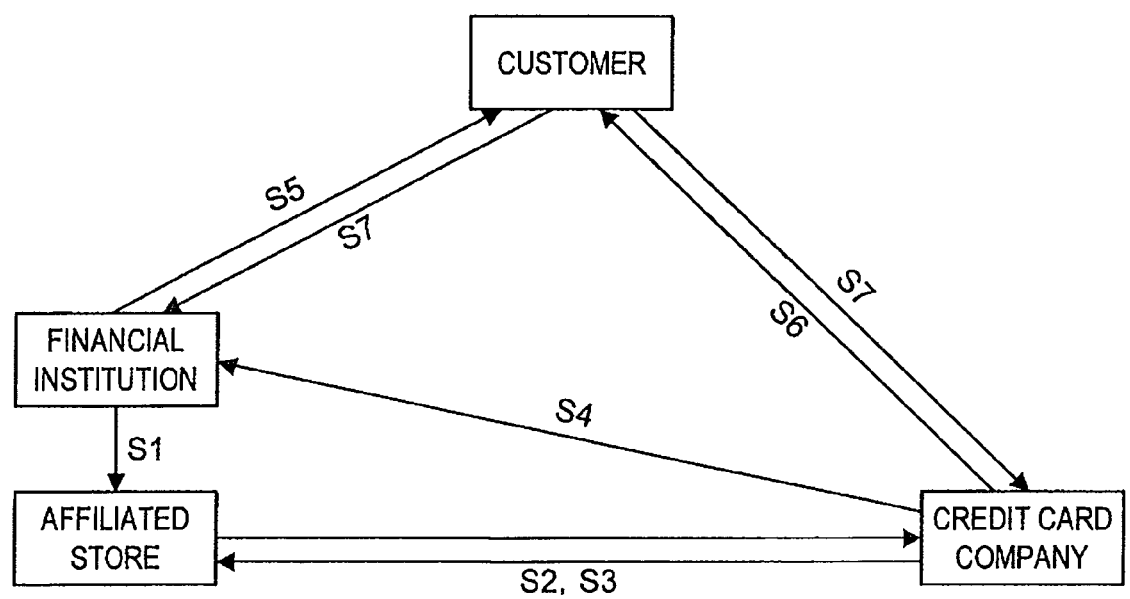
FIG. 1 is an explanatory view showing a flow of settlement by a credit card.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE PREFERRED EMBODIMENTS" will be described in the order of items shown below.

[1] Brief overview of settlement by credit card
[2] Regarding bank server according to first embodiment
   [2-1] Hardware configuration of bank server according to first embodiment
   [2-2] Function of bank server according to first embodiment
   [2-3] Operation of bank server according to first embodiment
[3] Regarding bank server according to second embodiment
   [3-1] Function of bank server according to second embodiment
   [3-2] Operation of bank server according to second embodiment
[4] Conclusion

[1] Brief Overview of Settlement by Credit Card

First, the settlement by credit cards will be schematically described with reference to FIG. 1.

FIG. 1 is an explanatory view showing the flow of settlement by a credit card. More specifically, FIG. 1 shows the flow of settlement by a customer, a credit card company of the credit card, an affiliated store of the credit card company, and a financial institution managing the savings account of the customer.

(Step S1)

First, the customer demands for a product or a service with respect to the affiliated store, and pays for the product or the service with a credit card. The customer may directly go to the affiliated store and pay for the expense with the credit card, or may pay for the expense with the credit card through the Internet. The affiliated store may be a product distributor that distributes products, a tour agency that makes reservation services for accommodations and transportation means, an education provider that provides education services, a content distributor that provides distribution services of contents such as music and video, or a security provider that provides security services to prepare for an abnormal event.

(Steps S2 and S3)

The affiliated store then transfers information recorded on the credit card used by the customer to the credit card company through a network for credit card reference. The card company checks the validity of the credit card, references the card credit balance of the customer etc. based on the information received from the affiliated store. If the credit card does not have any issues, the credit card company then approves of the payment for the expense with the credit card at the affiliated store.

Thereafter, the affiliated store sends a sales sheet showing information related to the payment by the credit card to the credit card company, or transmits the information related to the payment to the credit card company by inputting from a credit card terminal. The credit card company coordinates the usage amount of the credit card at the affiliated store every constant period, and deposits the amount, subtracting the commission of the credit card company from the usage amount, to the bank account specified by the affiliated store.

(Step S4)

The credit card company notifies, every predetermined period, the customer of the statement of the usage expense of the credit card used by the customer, and the expense withdrawal date from the specified bank account of the customer. However, if the credit card is not used by the customer during the predetermined period, such notification is not made.

(Step S5)

The customer grasps the previous usage amount and the withdrawal date of the credit card by checking the notification in step S4, and deposits money, as necessary, to the account managed by the financial institution before the withdrawal date. If withdrawal in a foreign currency occurs, the customer buys the foreign currency with part of the yen deposit of the yen savings account, and appropriates the bought foreign currency to the foreign currency account. In this case, the customer normally buys the foreign currency at the currency exchange rate including currency exchange cost caused from buying and selling in a financial institution such as a bank. The currency exchange cost and the currency exchange rate will be hereinafter described with reference to FIG. 7.

(Step S6)

The credit card company requests the financial institution for the transfer process (withdrawal process, settlement process) of the credit card usage amount from the account of the customer to the account specified by the credit card company. In response to the request from the credit card company, the financial institution performs the transfer process of the credit card usage amount. The details of such transfer process will be described in "[2] Regarding bank server according to first embodiment" and "[3] Regarding bank server according to second embodiment".

(Step S7)

When the transfer process of the credit card usage amount is completed, the financial institution notifies to the customer and the credit card company that the transfer process is completed. The settlement by the credit card is completed by the series of flow from step S1 to step S7 described above.

Background of the Present Embodiment

As described above, the financial institution performs the transfer process of the credit card usage amount requested by the credit card company. Assume a case where the customer uses the credit card in a foreign country and makes the payment in a foreign currency.

In this case, the financial institution is assumed to carry out the transfer process through the following methods.

1. Convert the usage amount in foreign currency to home currency, and transfer the converted usage amount from the account of the home currency of the customer.

2. If the customer has a foreign currency account, transfer the usage amount in foreign currency from the foreign currency account instead of the home currency account of the customer.

In the method 1, it is a disadvantage for the user in that cost caused when converting the usage amount between the foreign currency and the home currency. The method 2 is advantageous in that the cost to be paid by the customer is reduced.

However, in the method 2, the usage amount of the credit card is processed as not settled if the deposit balance of the foreign currency account is short with respect to the credit card usage amount. As a result, a case where the customer is forced to bear an unexpected burden due to shortage in balance of the savings account of the currency to be settled such as arise of late charge of the settlement is assumed. In particular, the customer having a foreign currency account often aims to carry out asset management by currency gain and the like, and buys and sells the foreign currency which the customer owns at the timing of the currency exchange rate, which becomes an issue.

Generally, when buying the foreign currency and making a deposit to the foreign currency account, the cost for buying the foreign currency is added, and thus the cost is not substantially greatly reduced even if the credit card usage amount is settled with the currency of the foreign country account as in the method 2.

A bank server 20 according to a first embodiment of the present invention, and a bank server 21 according to a second embodiment of the present invention are thereby contrived focusing on the above-described situation. According to the bank server 20 of the first embodiment of the present invention and the bank server 21 of the second embodiment of the present invention, a case where the customer is forced to bear the burden due to shortage in balance of the savings account of the currency to be settled can be suppressed. The bank server 20 according to the first embodiment of the present invention, and the bank server 21 according to the second embodiment of the present invention will be described below.

[2] Regarding Bank Server According to First Embodiment

First, the bank server 20 according to the first embodiment of the present invention will be described as one example of a withdrawal processing apparatus, arranged in the financial institution, for executing the transfer process (settlement process), with reference to FIGS. 2 to 13.

[2-1] Hardware Configuration of Bank Server According to First Embodiment

Figure 2:
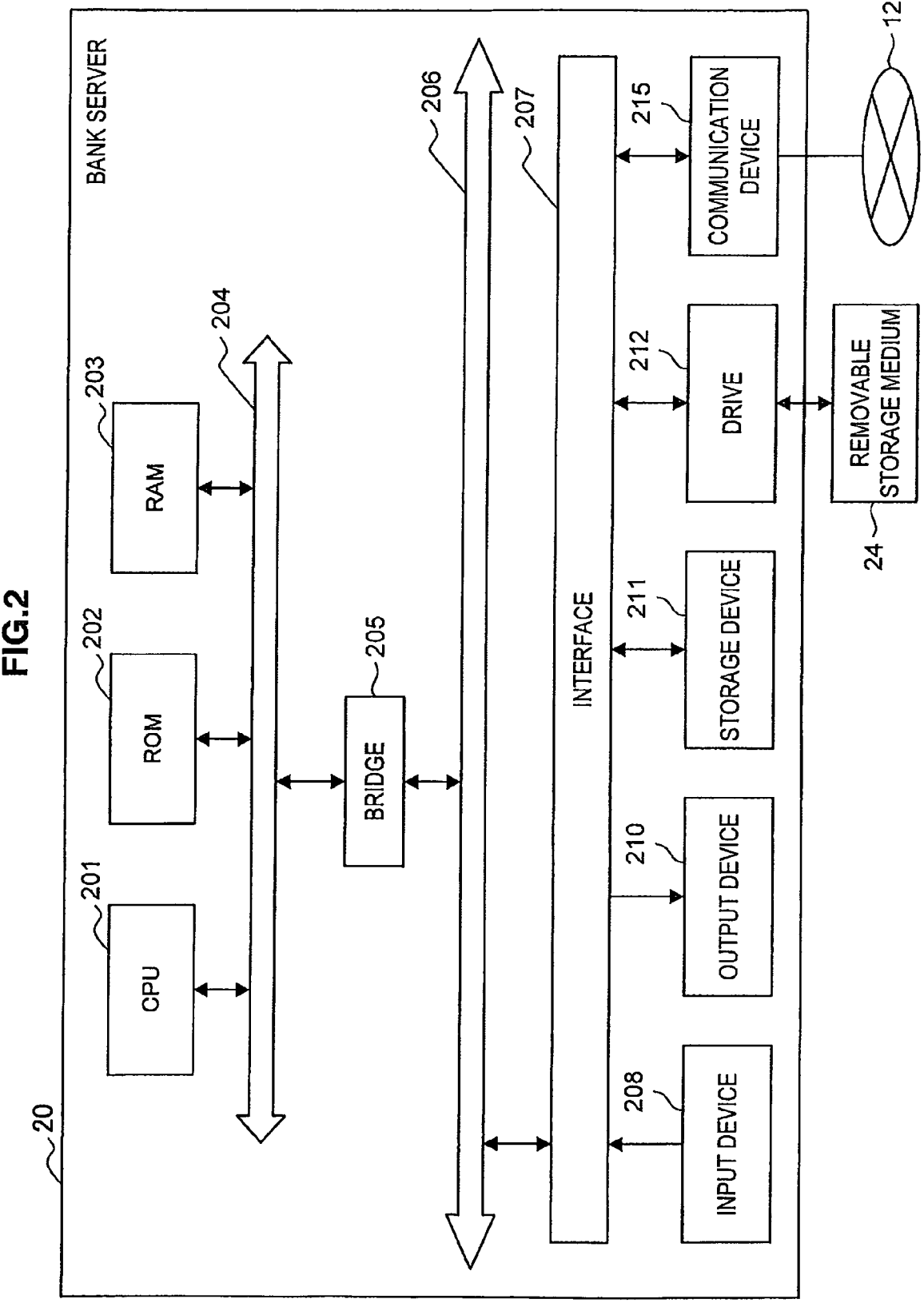
FIG. 2 is a block diagram showing a hardware configuration of a bank server.

FIG. 2 is a block diagram showing a hardware configuration of the bank server 20. The bank server 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, and a communication device 215.

The CPU 201 functions as a calculation processing device and a control device, and controls the entire operation of the bank server 20 according to various programs. The CPU 201 may be a microprocessor. The ROM 202 stores programs to be used by the CPU 201, calculation parameters and the like. The RAM 203 primary stores programs used in the execution of the CPU 201, parameters that are appropriately changed in the execution, and the like. These are interconnected by the host bus 204 including a CPU bus and the like.

The host bus 204 is connected to the external bus 206 such as PCI (Peripheral Component Interconnect/Interface) bus through the bridge 205. The host bus 204, the bridge 205, and the external bus 206 may be separately configured, and the respective functions may be implemented in one bus.

The input device 208 is configured to have an input unit for a manager of the bank server 20 to input information such as mouse, keyboard, touch panel, button, microphone, switch, and lever; an input control circuit for generating an input signal based on the input by the manager of the bank server 20, and outputting the signal to the CPU 201; and the like. The manager of the bank server 20 operates the input device 208 to input various data or instruct the processing operation to the bank server 20.

The output device 210 is configured to have a display device such as CRT (Cathode Ray Tube) display device, liquid crystal display (LCD) device, OLED (Organic Light Emitting Display) device, and lamp; and an audio output device such as speaker and headphone. The output device 210 outputs the reproduced content. Specifically, the display device displays various information such as reproduced image data in text or in image. On the other hand, the audio output device converts the reproduced audio data to audio, and outputs the audio.

The storage device 211 is a device for storing data configured as one example of a storage unit of the bank server 20 according to the present embodiment. The storage device 211 may include a storage medium, a recording device for recording data on the storage medium, a readout device for reading out data from the storage medium, and a deleting device for deleting data recorded on the storage medium. The storage device 211 includes HDD (Hard Disk Drive), or the like. The storage device 211 drives the hard disc, and stores programs to be executed by the CPU 201, and various data. The storage device 211 is also recorded with customer information DB, yen deposit information DB, and the like, as hereinafter described.

The drive 212 is a storage medium reader/writer, and is incorporated in or is externally attached to the bank server 20. The drive 212 reads out information recorded on a removable storage medium 24 such as magnetic disc, optical disc, magnetic optical disc, or semiconductor memory that is loaded, and outputs the information to the RAM 203.

The communication device 215 is a communication interface configured to include a communication device and the like for connecting to a communication network 12. The communication network 12 is a wired or wireless transmission path for information transmitted from a device connected to the communication network 12. For instance, the communication network 12 may include public line network such as Internet, telephone line network, and satellite communication network; or dedicated line network such as various LAN (Local Area Network) including Ethernet (registered trademark), WAN (Wide Area Network), or IP-VPN (Internet Protocol-Virtual Private Network). The communication device 215 transmits and receives various data with a customer terminal 10 and a credit card company's device 30 through such communication network 12.

[2-2] Function of Bank Server According to First Embodiment

The hardware configuration of the bank server 20 according to the present embodiment has been described above with reference to FIG. 2. Now, the function of the bank server 20 according to the present embodiment will be described with reference to FIGS. 3 to 10.

Figure 3:
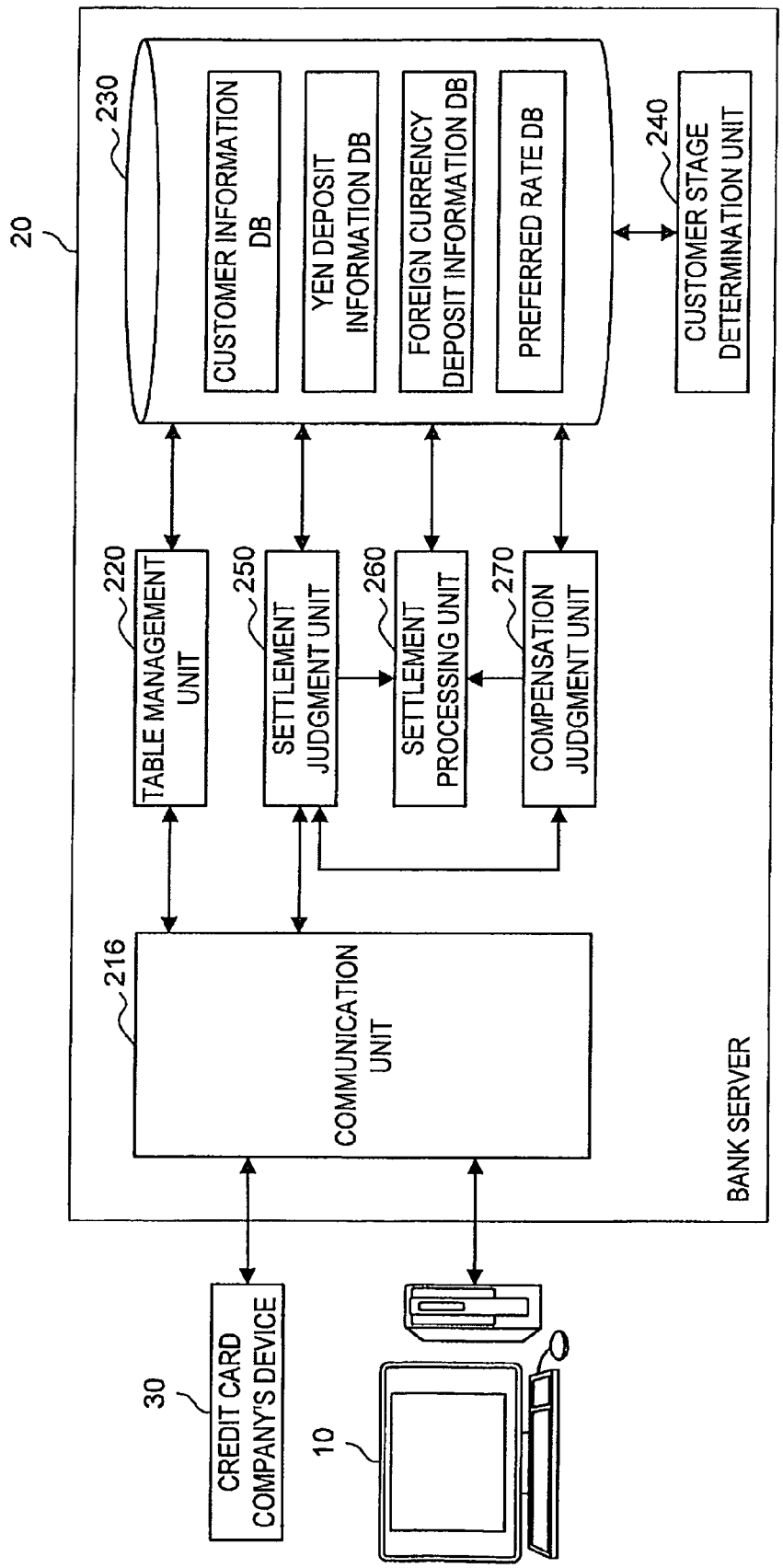
FIG. 3 is a function block diagram showing a configuration of a bank server according to a first embodiment.

FIG. 3 is a function block diagram showing a configuration of the bank server 20 according to the present embodiment. As shown in FIG. 3, the bank server 20 according to the present embodiment includes a communication unit 216, a table management unit 220, a storage unit 230, a customer stage determination unit 240, a settlement judgment unit 250, a settlement processing unit 260, and a compensation judgment unit 270.

The communication unit 216 is connected through the communication network 12 to the customer terminal 10 and the credit card company's device 30 arranged in the credit card company, and has a function serving as a reception unit and a transmission unit. The communication unit 216 also has a function of an acquiring unit for acquiring from the credit card company's device 30 the withdrawing demanded amount from the customer account. The communication unit 216 also has a function of acquiring a reference rate at a predetermined interval from an information providing server which provides the reference rate (currency exchange rate) described with reference to FIG. 7.

A PC (Personal Computer) is shown as one example of the customer terminal 10 in FIG. 3, but the customer terminal 10 may be an information processing device such as a portable telephone, a PHS (Personal Handy phone System), a portable music playback device, a portable image processing device, a PDA (Personal Digital Assistants), a home video game machine, or a household equipment.

The table management unit 220 manages each DB stored in the storage unit 230. For instance, the table management unit 220 creates a customer table related to a new customer and registers the customer table in the customer information DB, updates the content of the customer table, or deletes the content as necessary.

(Configuration of Each DB)

The storage unit 230 stores arbitrary data such as the customer information DB, the yen deposit information DB, a foreign currency deposit information DB, and a preferred rate DB. The customer information DB, the yen deposit information DB, and the foreign currency deposit information DB will be described below with reference to FIG. 4.

Figure 4:
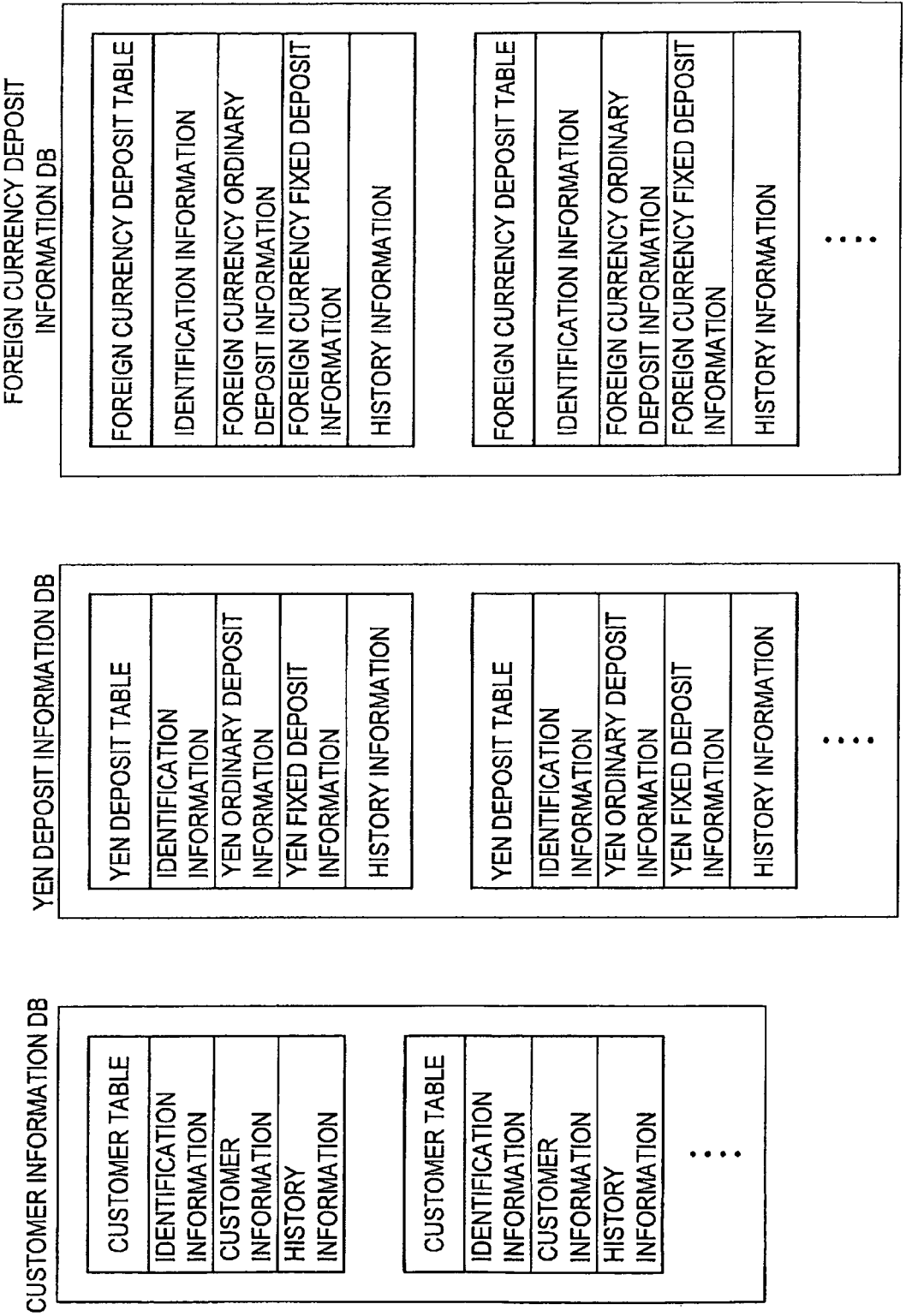
FIG. 4 is an explanatory view showing a configuration example of a customer information DB, a yen deposit information DB, and a foreign currency deposit information DB.

FIG. 4 is an explanatory view showing a configuration example of the customer information DB, the yen deposit information DB, and the foreign currency deposit information DB. As shown in FIG. 4, the customer information DB includes a customer table for every customer; the yen deposit information DB includes a yen deposit table for every customer; and the foreign currency deposit information DB includes a foreign currency deposit table for every customer.

Furthermore, the customer table includes identification information, customer information, and history information. The identification information is information for identifying the customer registered in the bank server 20 and corresponds to an account number and the like. The customer information is information related to the customer, and may include information such as name, age, birthday, address, telephone number, e-mail address of a home PC, occupation, family structure, annual income, and password of the customer. The customer information also includes information indicating whether or not the customer has a foreign currency credit card, and a customer stage indicating the degree of grading of the customer. The history information includes information before update and information after update of the customer table. For instance, the history information is recorded with the password before change if the password is changed, and is recorded with the address before change if the address of the customer is changed.

The yen deposit table includes identification information, yen ordinary deposit information, fixed deposit information, and history information. The identification information is information identifying the customer, where the bank server 20 references the identification information to search for the yen deposit table of the target customer. The yen ordinary deposit information includes current balance information of the ordinary deposit. The yen fixed deposit information includes information related to the yen fixed deposit of every scheduled fixed period such as one million yen of one-year time, due date, and interest. The history information indicates the content of transaction and action previously made by the customer, and includes information related to deposit and withdrawal amounts, and date and time with respect to the yen ordinary deposit and the yen fixed deposit.

The foreign currency deposit table includes identification information, foreign currency ordinary deposit information, foreign currency fixed deposit information, and history information. The identification information is information identifying the customer, where the bank server 20 references the identification information to search for the foreign currency deposit table of the target customer. The foreign currency ordinary deposit information includes current balance information of the ordinary deposit. The foreign currency fixed deposit information includes information related to the foreign currency fixed deposit. The history information indicates the content of transaction and action previously made by the customer, and includes information related to deposit and withdrawal amounts, and date and time with respect to the foreign currency ordinary deposit and the foreign currency fixed deposit.

The table management unit 220 searches for the yen deposit table and the foreign currency deposit table including the identification information indicating the customer when the customer sells foreign currency and buys yen. The table management unit 220 subtracts the amount indicated by the foreign currency ordinary deposit information in the foreign currency deposit table, converts the subtracted amount to yen at the current currency exchange rate, and adds the converted yen amount to the amount indicated by the yen ordinary deposit information in the yen deposit table. Furthermore, the table management unit 220 records information such as date and time, and increase and decrease in the amount in the history information included in both the yen deposit table and the foreign currency deposit table.

The foreign currency ordinary deposit information and the foreign currency fixed deposit information of the foreign currency deposit table are recorded with data for every currency of each country such as dollar and euro. Thus, the foreign currency ordinary deposit information and the foreign currency fixed deposit information contain an identifier (e.g., US dollar is 1, euro is 2) of the currency of each country, so that the bank server 20 can perform a process related to a specific currency based on the relevant identifier.

The storage unit 230 recorded with such various DBs may be a storage medium including a non-volatile memory such as EEPROM (Electrically Erasable Programmable Read-Only Memory) and EPROM (Erasable Programmable Read Only Memory); a magnetic disc such as hard disc and disc-shaped magnetic body disc; an optical disc such as CD-R (Compact Disc Recordable)/RW (ReWritable), DVD-R (Digital Versatile Disc Recordable)/RW/+R/+RW/RAM (Random Access Memory), and BD (Blu-Ray Disc (registered trademark))-R/BD-RE; or an MO (Magneto Optical) disc.

(Regarding Customer Stage)

The customer stage determination unit 240 shown in FIG. 3 determines the customer stage, and records the determined customer stage in the customer information shown in FIG. 4. The customer stage will be described with reference to FIGS. 5 to 7.

Figure 5:
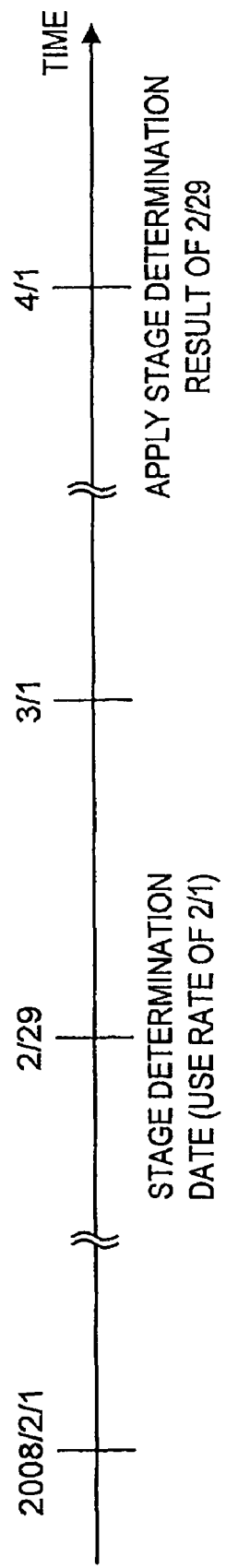
FIG. 5 is an explanatory view showing a relationship between a stage determination date and an application date of the determination result.

FIG. 5 is an explanatory view showing a relationship between a stage determination date and an application date of the determination result. As shown in FIG. 5, the customer stage determination unit 240 determines the customer stage of each customer at the end of every month, for example. Specifically, the customer stage determination unit 240 first converts the balance of the foreign currency deposit (include fixed deposit) of the customer to yen. In this case, the customer stage determination unit 240 performs the conversion based on the currency exchange rate of the first date of the determination month. For instance, when performing the stage determination on 2/29, the customer stage determination unit 240 converts the balance of the foreign currency deposit to yen based on the currency exchange rate of 2/1. The customer stage determination unit 240 determines the stage corresponding to the total amount of the deposit balance of the foreign currency converted to yen based on the stage determination table shown in FIG. 6.

FIG. 6 is an explanatory view showing one example of the stage determination table. As shown in the stage determination table of FIG. 6, "deposit balance of greater than or equal to 1,000,000 yen and less than 3,000,000 yen" corresponds to stage 1, "deposit balance of greater than or equal to 3,000,000 yen" corresponds to stage 2, and "deposit balance of less than 1,000,000 yen" corresponds to outside stage. Since the reference is more easily recognized if all the foreign currencies owned by the customer are standardized to one currency, the stage determination table having the yen as the reference is shown in FIG. 6.

Therefore, the customer stage determination unit 240 primarily determines that the customer stage of the relevant customer is stage 1 if the total value of the deposit balance of the foreign currency of a certain customer is, for example, 2,000,000 yen.

Furthermore, the customer stage determination unit 240 may give preference to the customer stage if the information that the customer owns a foreign currency credit card applied with the settlement process method according to the present embodiment is included in the customer information. For instance, the customer stage determination unit 240 may determine the stage one rank higher than the primarily determined stage as the customer stage if the customer owns the foreign currency credit card. Alternatively, the customer stage determination unit 240 may further add a predetermined amount to the total value of the deposit balance of the foreign currency to determine the customer stage.

The customer stage determined in this manner is recorded in the customer information. The customer stage determined at the end of the month is applied in the month after next. For example, the customer stage determined on 2/29 is applied from 4/1 to 4/30 as shown in FIG. 5. From the standpoint of returning the profit of the bank to the customer, the setting is made such that the currency exchange rate reduces with respect to the customer with high foreign currency deposit balance (i.e., returns profit to customers who bought more foreign currencies). Specifically, as shown in FIG. 7, the currency exchange cost is given preference the higher the rank of the customer stage.

FIG. 7 is an explanatory view showing a relationship between the customer stage and the currency exchange cost. If the customer stage is outside stage, the currency exchange cost shown on the upper level of FIG. 7 is applied. Specifically, when in outside stage, the currency exchange cost of 0.25 yen is set when selling one US dollar. Therefore, if the reference rate acquired by the communication unit 216 is 107.78, the selling rate is 107.53 yen, which is obtained by subtracting 0.25 yen from the reference rate. Similarly, when in outside stage, the currency exchange cost of 0.25 yen is set when buying one US dollar. Therefore, if the reference rate is 107.78, the buying rate is 108.03 yen, which is obtained by adding 0.25 yen to the reference rate.

In customer stage 1, the currency exchange cost of 0.20 yen is set when selling one US dollar. Therefore, if the reference rate is 107.78, the selling rate is 107.58 yen, which is obtained by subtracting 0.20 yen from the reference rate. Similarly, in customer stage 1, the currency exchange cost of 0.20 yen is set when buying one US dollar. Therefore, if the reference rate acquired by the communication unit 216 is 107.78, the buying rate is 107.98 yen, which is obtained by adding 0.20 yen to the reference rate. Thus, in customer stage 1, the selling rate is higher than in outside stage, and the buying rate is lower than in outside stage, which is advantageous to the customers. Regarding the euro, the customer of customer stage 1 is similarly given more preferential than the customer of outside stage.

Furthermore, in customer stage 2, the currency exchange cost of 0.10 yen is set when selling one US dollar. Therefore, if the reference rate is 107.78, the selling rate is 107.68 yen, which is obtained by subtracting 0.10 yen from the reference rate. Similarly, in customer stage 2, the currency exchange cost of 0.10 yen is set when buying one US dollar. Therefore, if the reference rate acquired by the communication unit 216 is 107.78, the buying rate is 107.88 yen, which is obtained by adding 0.10 yen to the reference rate. Thus, in customer stage 2, the selling rate is higher than the customer stage 1, and the buying rate is lower than the customer stage 1, which is advantageous to the customers. Regarding the euro, the customer of customer stage 2 is similarly given more preferential than the customer of customer stage 1.

If the currency exchange rate of when the customer actually buys a product with foreign currency using a foreign currency credit card according to the present embodiment and the currency exchange rate at the time of making the settlement (in time of foreign currency compensation) are greatly apart, it is cruel to impose further currency exchange cost on the customer. Therefore, compensation at the currency exchange rate closer to the reference rate is enabled by applying the preferred rate to the high-grade customers, so that the burden of the customer can be alleviated.

(Settlement Process)

Returning to the explanation of the configuration of the bank server 20 with reference to FIG. 3, the settlement judgment unit 250 has a function serving as a withdrawal judgment unit of judging for every currency whether or not the usage demanded amount requested for settlement from the credit card company's device 30 is within a range of the deposit balance of the target customer. In the first embodiment, a case where the customer has a US dollar deposit as one foreign currency deposit in addition to the yen deposit will be described. The foreign currency deposit is not limited to the US dollar deposit, and may be a euro deposit. If the home currency is US dollar, the foreign currency deposit may be the yen deposit or the euro deposit; or if the home currency is euro, the foreign currency deposit may be the yen deposit or the US dollar deposit.

The settlement processing unit 260 has a function serving as a withdrawal processing unit for performing the settlement process of the usage demanded amount from the currency account where the usage demanded amount is judged as being within the deposit balance by the settlement judgment unit 250. Specifically, the settlement processing unit 260 transfers, for every currency, the usage demanded amount from the currency account where the usage demanded amount is judged as being within the deposit balance by the settlement judgment unit 250 to the account specified by the credit card company.

The compensation judgment unit 270 judges whether or not the shortage amount of the US dollar deposit balance with respect to the usage demanded amount is within the range of the yen deposit balance if determined that only the usage demanded amount related to US dollar is outside the range of the deposit balance by the settlement judgment unit 250. Here, the compensation judgment unit 270 judges whether or not the shortage amount of the US dollar deposit balance is within the range of the yen deposit balance in view of the currency exchange cost based on the customer stage. If determined that the shortage amount of the US dollar deposit balance is within the range of the yen deposit balance by the compensation judgment unit 270, the settlement processing unit 260 compensates the shortage amount from the yen deposit and performs the settlement process of the usage demanded amount related to US dollar.

According to such configuration, the shortage amount is compensated from the yen deposit even if the usage demanded amount related to US dollar is outside the range of the US dollar deposit balance. Therefore, a case where the usage demanded amount related to US dollar is not settled is suppressed. As a result, the issue that the customer is forced to bear unexpected burden due to shortage of the US dollar deposit balance such as arise of late charge of the settlement can be alleviated. In the present embodiment, a priority table, to be described in the second embodiment, may not be used, and thus the processing time can be reduced compared to the second embodiment.

The compensation judgment unit 270 performs the process such that the usage demanded amount related to US dollar is preferentially settled if judged that the usage demanded amount is outside the range of the US dollar deposit balance and that the usage demanded amount is outside the range of the yen deposit balance by the settlement judgment unit 250. Specifically, as a first stage, the compensation judgment unit 270 judges whether or not the shortage amount of the US dollar deposit balance with respect to the usage demanded amount related to US dollar can be compensated from the yen deposit, and compensates the shortage amount from the yen deposit if compensation is possible to preferentially settle the usage demanded amount related to US dollar. As a second stage, the compensation judgment unit 270 judges whether or not the shortage amount of the yen deposit balance with respect to the usage demanded amount related to yen can be compensated from the US dollar deposit, and compensates the shortage amount from the US dollar deposit if compensation is possible. Here, the compensation judgment unit 270 judges whether or not the shortage amount of the yen deposit balance and the US dollar deposit balance can be compensated in view of the currency exchange cost based on the customer stage. The matter of preferentially settling the usage demanded amount related to US dollar may be determined in advance.

The compensation judgment unit 270 judges whether or not the shortage amount of the yen deposit of the yen deposit balance with respect to the usage demanded amount is within the range of the US dollar deposit balance if judged that only the usage demanded amount related to yen is outside the range of the deposit balance by the settlement judgment unit 250. Here, whether or not the shortage amount of the yen deposit balance is within the range of the US dollar deposit balance is judged in view of the currency exchange cost based on the customer stage. If judged that the shortage amount of the yen deposit balance is within the range of the US dollar deposit balance by the compensation judgment unit 270, the settlement processing unit 260 compensates the shortage amount from the US dollar deposit and performs the settlement process of the usage demanded amount related to yen.

The functions of the settlement judgment unit 250, the settlement processing unit 260, and the compensation judgment unit 270 have been described above. Now, the settlement process performed by the settlement judgment unit 250, the settlement processing unit 260, and the compensation judgment unit 270 will be specifically described with reference to FIGS. 8 to 10.

FIGS. 8 to 10 are explanatory views showing specific examples of the settlement process performed by the settlement processing unit 260 and the compensation judgment unit 270. In the description of FIGS. 8 to 10, one US dollar is set to correspond to 100 yen, and the currency exchange cost is assumed to not arise for the sake of convenience of the explanation.

Figure 8A:
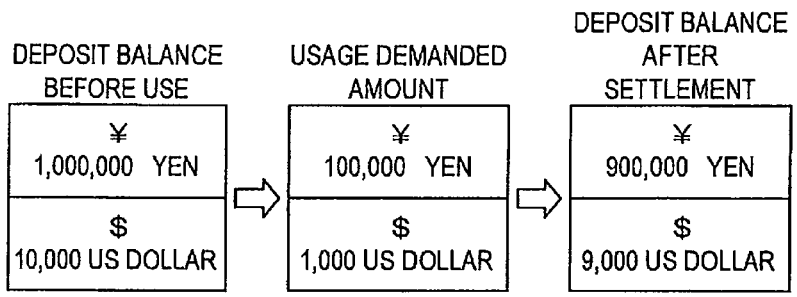
FIG. 8A is an explanatory view showing a specific example of the settlement process performed by the settlement processing unit and the compensation judgment unit.

FIG. 8A shows a settlement example of when a request is made to transfer 100,000 yen and 1,000 US dollars to the specified account of the credit card company with respect to the customer having a yen deposit of 1,000,000 yen and a US dollar deposit of 10,000 US dollars. In this case, the settlement judgment unit 250 judges that the US dollar deposit balance is within the range of the US dollar demanded amount, and judges that the yen deposit balance is within the range of the yen demanded amount.

Therefore, the settlement processing unit 260 updates the US dollar deposit balance to 9,000 US dollars, which is obtained by subtracting 1,000 US dollars from 10,000 US dollars, and updates the yen deposit balance to 900,000 yen, which is obtained by subtracting 100,000 yen from 1,000,000 yen. The subtracted amount is transferred to the specified account of the credit card company. For instance, the bank server 20 makes a deposit request to the specified account of the specified bank, and the transfer is completed when a notification that the deposit request is completed is received. The specified account of the credit card company may be an account of the same bank as the customer, or may be an account of a different bank. After the settlement process is completed, the notification that the settlement is terminated is notified to the customer and the credit card company. The usage demand from the credit card company related to yen and US dollar occurs when the customer makes the yen payment using the yen credit card in Japan and makes the US dollar payment using the dollar credit card in the United States.

Figure 8B:
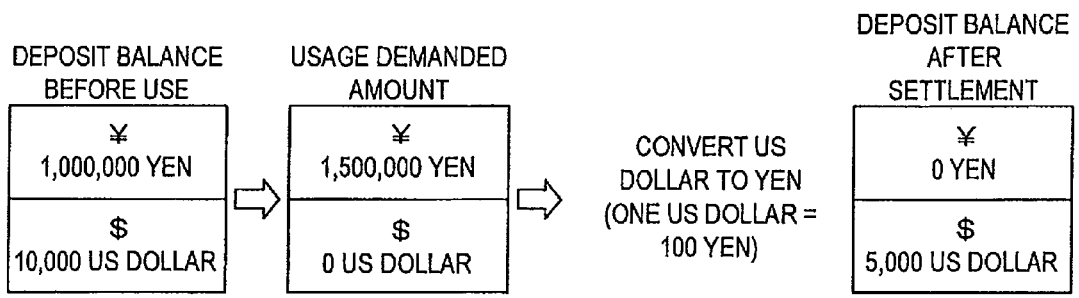
FIG. 8B is an explanatory view showing a specific example of the settlement process performed by the settlement processing unit and the compensation judgment unit.

FIG. 8B shows a settlement case of when a request to transfer 1,500,000 yen to the specified account of the credit card company is made with respect to the customer having a yen deposit of 1,000,000 yen and a US dollar deposit of 10,000 US dollars. In this case, the settlement judgment unit 250 judges that the yen deposit balance is outside the range of the yen demanded amount.

Therefore, the compensation judgment unit 270 judges whether or not 500,000 yen, which is the shortage amount of the yen deposit balance with respect to the yen demanded amount, can be compensated from the US dollar deposit. Since the US dollar deposit balance is within the range of 500,000 yen, which is the shortage amount, the compensation judgment unit 270 judges that the compensation is possible. Thus, the settlement processing unit 260 compensates 5,000 US dollars, which corresponds to 500,000 yen or the shortage amount, to the yen deposit, and performs the settlement process of the yen demanded amount with 1,500,000 yen after the compensation. As a result, the US dollar deposit balance becomes 5,000 US dollars.

Figure 8C:
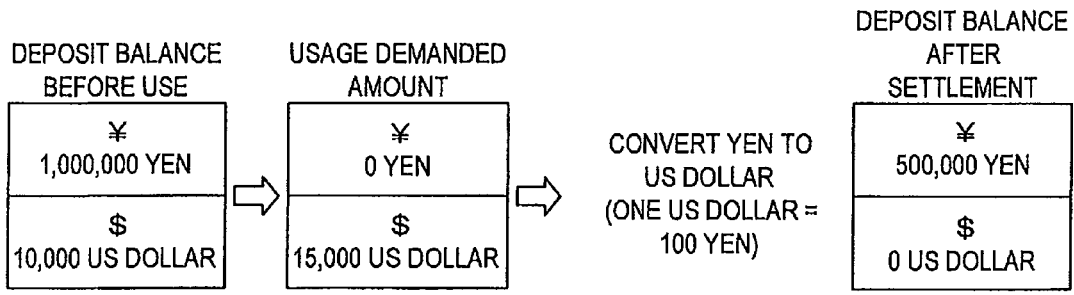
FIG. 8C is an explanatory view showing a specific example of the settlement process performed by the settlement processing unit and the compensation judgment unit.

FIG. 8C shows a settlement case of when a request to transfer 15,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance is outside the range of the US dollar demanded amount.

Therefore, the compensation judgment unit 270 judges whether or not 5,000 US dollars, which is the shortage amount of the US dollar deposit balance with respect to the US dollar demanded amount, can be compensated from the yen deposit. Since the yen deposit balance is within the range of 5,000 US dollars, which is the shortage amount, the compensation judgment unit 270 judges that the compensation is possible. Thus, the settlement processing unit 260 compensates 500,000 yen, which corresponds to 5,000 US dollars or the shortage amount, to the US dollar deposit, and performs the settlement process of the US dollar demanded amount with 15,000 US dollars after the compensation. As a result, the yen deposit balance becomes 500,000 yen.

Figure 8D:
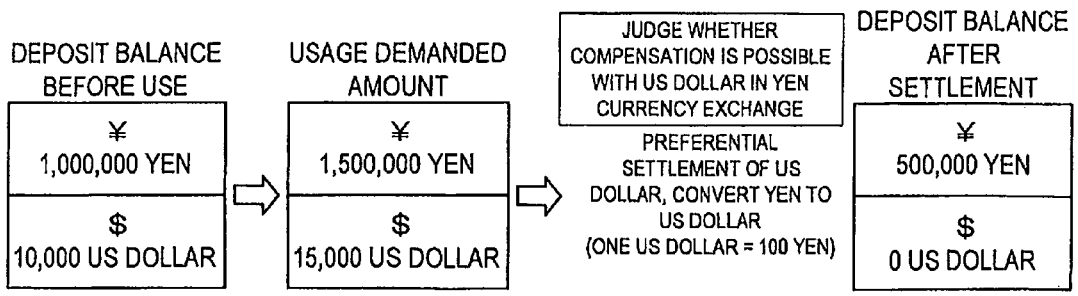
FIG. 8D is an explanatory view showing a specific example of the settlement process performed by the settlement processing unit and the compensation judgment unit.

FIG. 8D shows a settlement case of when a request to transfer 1,500,000 yen and 15,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance and the yen deposit balance are respectively outside the range of the demanded amount.

Therefore, the compensation judgment unit 270 first judges whether or not 5,000 US dollars, which is the shortage amount of the US dollar deposit balance with respect to the US dollar demanded amount, can be compensated from the yen deposit. Since the yen deposit balance is within the range of 5,000 US dollars, which is the shortage amount, the compensation judgment unit 270 judges that the compensation is possible. Thus, the settlement processing unit 260 compensates 500,000 yen, which corresponds to 5,000 US dollars or the shortage amount, to the US dollar deposit, and performs the settlement process of the US dollar demanded amount with 15,000 US dollars after the compensation. As a result, the yen deposit balance becomes 500,000 yen, and the yen demanded amount is not settled. In this case, the bank server 20 notifies the shortage amount with respect to the yen demanded amount to the customer.

Figure 9A:
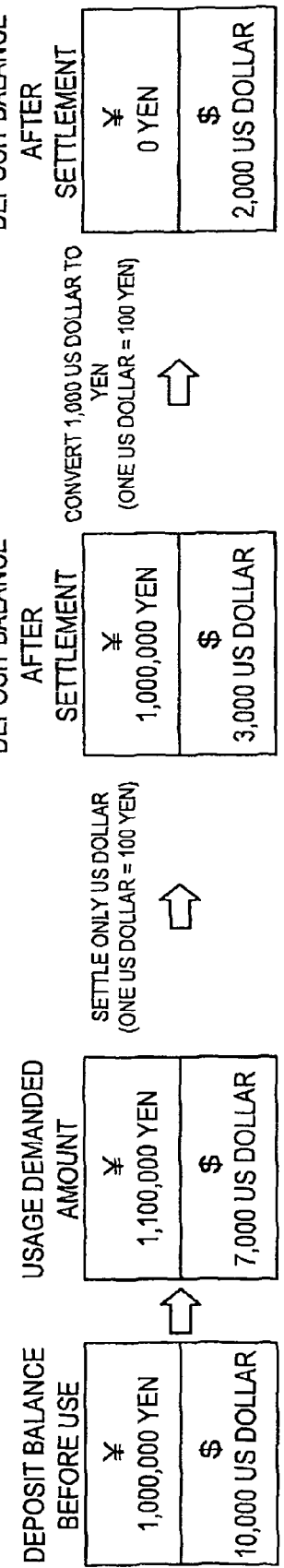
FIG. 9A is an explanatory view showing a specific example of the settlement process performed by the settlement processing unit and the compensation judgment unit.

FIG. 9A shows a settlement case of when a request to transfer 1,100,000 yen and 7,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance is within the range of the US dollar demanded amount, and judges that the yen deposit balance is outside the range of the yen demanded amount. Therefore, the settlement processing unit 260 updates the US dollar deposit balance to 3,000 US dollar, which is obtained by subtracting 7,000 US dollars from 10,000 US dollars.

Subsequently, the compensation judgment unit 270 judges that 100,000 yen, which is the shortage amount of the yen deposit balance with respect to the yen demanded amount, is within the range of the US dollar deposit balance. Therefore, the settlement processing unit 260 compensates 1,000 US dollars, which corresponds to 100,000 yen or the shortage amount, to the yen deposit, and performs the settlement process of the yen demanded amount with 110,000 yen after the compensation. As a result, the yen deposit balance becomes 0 yen, and the US dollar deposit balance becomes 2,000 US dollars.

Figure 9B:
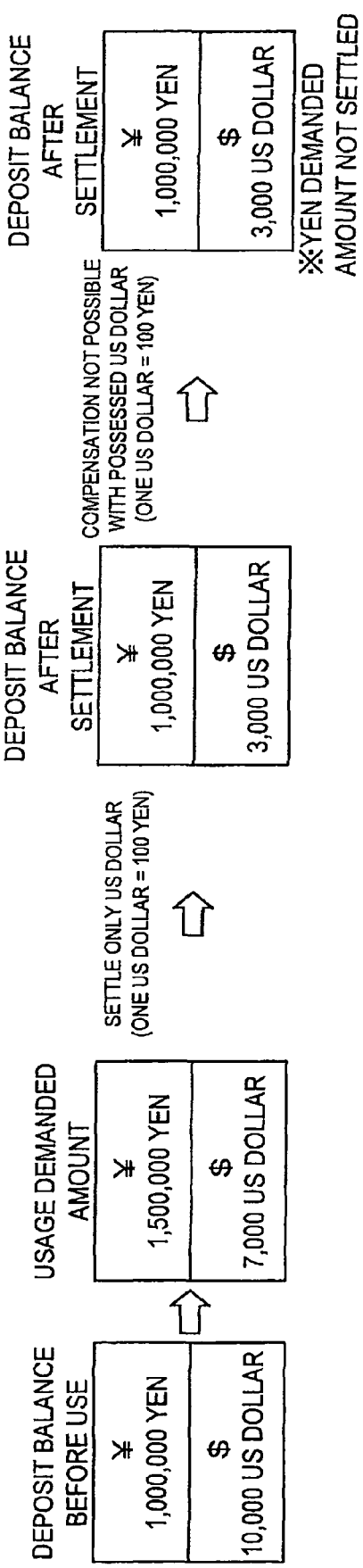
FIG. 9B is an explanatory view showing a specific example of the settlement process performed by the settlement processing unit and the compensation judgment unit.

FIG. 9B shows a settlement case of when a request to transfer 1,500,000 yen and 7,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance is within the range of the US dollar demanded amount, and judges that the yen deposit balance is outside the range of the yen demanded amount. Therefore, the settlement processing unit 260 updates the US dollar deposit balance to 3,000 US dollars, which is obtained by subtracting 7,000 US dollars from 10,000 US dollars.

Subsequently, the compensation judgment unit 270 judges that 500,000 yen, which is the shortage amount of the yen deposit balance with respect to the yen demanded amount, is outside the range of the US dollar deposit balance. Therefore, the settlement processing unit 260 may not perform the settlement process of the yen demanded amount. In this case, the yen deposit balance becomes 1,000,000 yen, the US dollar deposit balance becomes 2,000 US dollars, and the yen demanded amount is not settled.

Figure 9C:
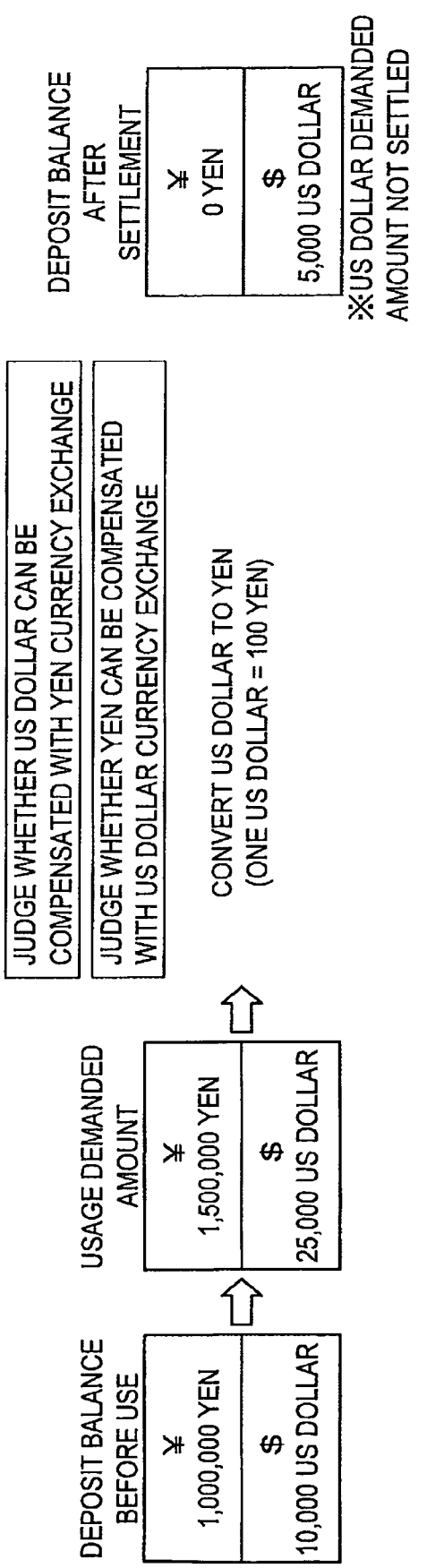
FIG. 9C is an explanatory view showing a specific example of the settlement process performed by the settlement processing unit and the compensation judgment unit.

FIG. 9C shows a settlement case of when a request to transfer 1,500,000 yen and 25,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance is outside the range of the US dollar demanded amount, and judges that the yen deposit balance is outside the range of the yen demanded amount. Therefore, the settlement processing unit 260 may not settle the yen demanded amount and the US dollar demanded amount without compensation.

In this case, the compensation judgment unit 270 first judges whether or not the shortage amount of the US dollar deposit balance with respect to the US dollar demanded amount can be compensated from the yen deposit. However, since the shortage amount of the US dollar deposit balance is 15,000 US dollars and the yen deposit balance is 1,000,000 yen, the compensation judgment unit 270 judges that the shortage amount of the US dollar deposit balance may not be compensated from the yen deposit.

Subsequently, the compensation judgment unit 270 judges whether or not the shortage amount of the yen deposit balance with respect to the yen demanded amount can be compensated from the US dollar deposit. In this case, since the shortage amount of the yen deposit balance is 500,000 yen and the US dollar deposit balance is 10,000 US dollars, the compensation judgment unit 270 judges that the shortage amount of the yen deposit balance can be compensated from the US dollar deposit. Therefore, the settlement processing unit 260 compensates 5,000 US dollars, which corresponds to 500,000 yen or the shortage amount, to the yen deposit, and performs the settlement process of the yen demanded amount with 1,500,000 yen after the compensation. As a result, the yen deposit balance becomes 0 yen, the US dollar deposit balance becomes 5,000 US dollars, and the US dollar demanded amount is not settled.

Figure 10A:
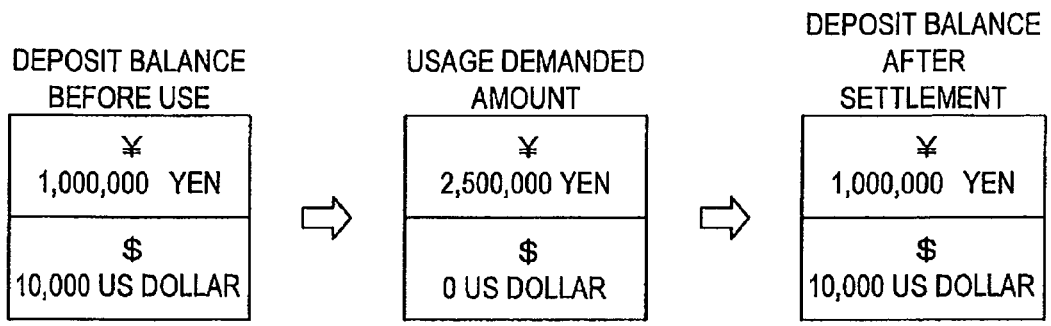
FIG. 10A is an explanatory view showing a specific example of the settlement process performed by the settlement processing unit and the compensation judgment unit.

FIG. 10A shows a settlement case of when a request to transfer 2,500,000 yen to the specified account of the credit card company is made with respect to the customer having a yen deposit of 1,000,000 yen and a US dollar deposit of 10,000 US dollars. In this case, the settlement judgment unit 250 judges that the yen deposit balance is outside the range of the yen demanded amount. Furthermore, the compensation judgment unit 270 judges whether or not the shortage amount of the yen deposit balance with respect to the yen demanded amount can be compensated from the US dollar deposit. In this case, the shortage amount of the yen deposit balance is 1,500,000 yen and the US dollar deposit balance is 10,000 US dollars, and thus the compensation judgment unit 270 judges that the shortage amount of the yen deposit balance may not be compensated from the US dollar deposit. Therefore, the settlement processing unit 260 may not settle the yen demanded amount, and the yen demanded amount is not settled.

Figure 10B:
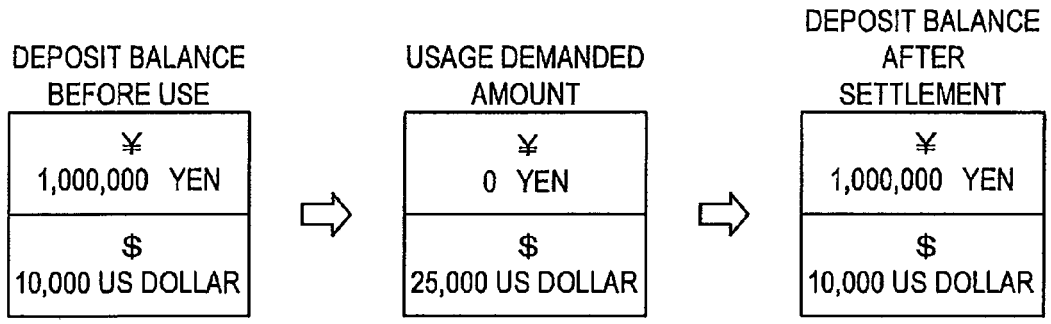
FIG. 10B is an explanatory view showing a specific example of the settlement process performed by the settlement processing unit and the compensation judgment unit.

FIG. 10B shows a settlement case of when a request to transfer 25,000 US dollars to the specified account of the credit card company is made with respect to the customer having a yen deposit of 1,000,000 yen and a US dollar deposit of 10,000 US dollars. In this case, the settlement judgment unit 250 judges that the US dollar deposit balance is outside the range of the US dollar demanded amount. Furthermore, the compensation judgment unit 270 judges whether or not the shortage amount of the US dollar deposit balance with respect to the US dollar demanded amount can be compensated from the yen deposit. In this case, the shortage amount of the US dollar deposit balance is 15,000 US dollars and the yen deposit balance is 1,000,000 yen, and thus the compensation judgment unit 270 judges that the shortage amount of the US dollar deposit balance may not be compensated from the yen deposit. Therefore, the settlement processing unit 260 may not settle the US dollar demanded amount, and the US dollar demanded amount is not settled.

Figure 10C:
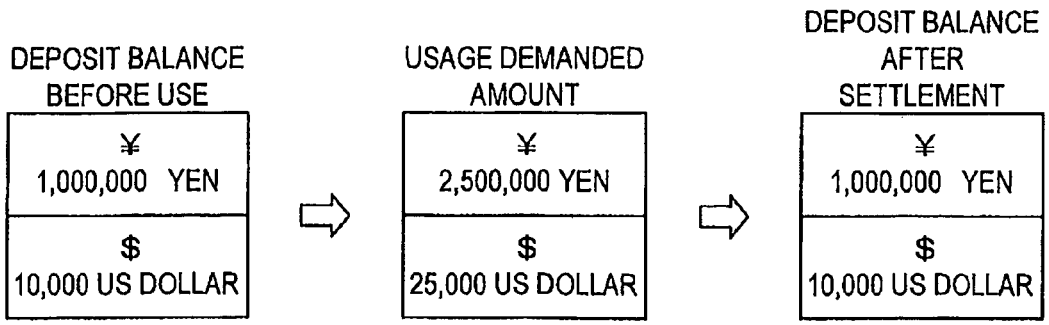
FIG. 10C is an explanatory view showing a specific example of the settlement process performed by the settlement processing unit and the compensation judgment unit.

FIG. 10C shows a settlement case of when a request to transfer 25,000 yen and 25,000 US dollars to the specified account of the credit card company is made with respect to the customer having a yen deposit of 1,000,000 yen and a US dollar deposit of 10,000 US dollars. In this case, the settlement judgment unit 250 judges that the yen deposit balance is outside the range of the yen demanded amount, and that the US dollar deposit balance is outside the range of the US dollar demanded amount. Therefore, the settlement processing unit 260 may not settle the yen demanded amount and the US dollar demanded amount without compensation.

In this case, the compensation judgment unit 270 first judges whether or not the shortage amount of the US dollar deposit balance with respect to the US dollar demanded amount can be compensated from the yen deposit. However, since the shortage amount of the US dollar deposit balance is 15,000 US dollars and the yen deposit balance is 1,000,000 yen, the compensation judgment unit 270 judges that the shortage amount of the US dollar deposit balance may not be compensated from the yen deposit. Subsequently, the compensation judgment unit 270 judges whether or not the shortage amount of the yen deposit balance with respect to the yen demanded amount can be compensated from the US dollar deposit. In this case, since the shortage amount of the yen deposit balance is 1,500,000 yen and the US dollar deposit balance is 10,000 US dollars, the compensation judgment unit 270 judges that the shortage amount of the yen deposit balance may not be compensated from the US dollar deposit. Therefore, the settlement processing unit 260 may not settle the US dollar demanded amount and the yen demanded amount, and the US dollar demanded amount and the yen demanded amount are not settled.

[2-3] Operation of Bank Server According to First Embodiment

The function of the bank server 20 according to the present embodiment has been described above with reference to FIGS. 3 to 10. Now, the operation of the bank server 20 according to the present embodiment will be described with reference to FIGS. 11 to 13.

Figure 12:
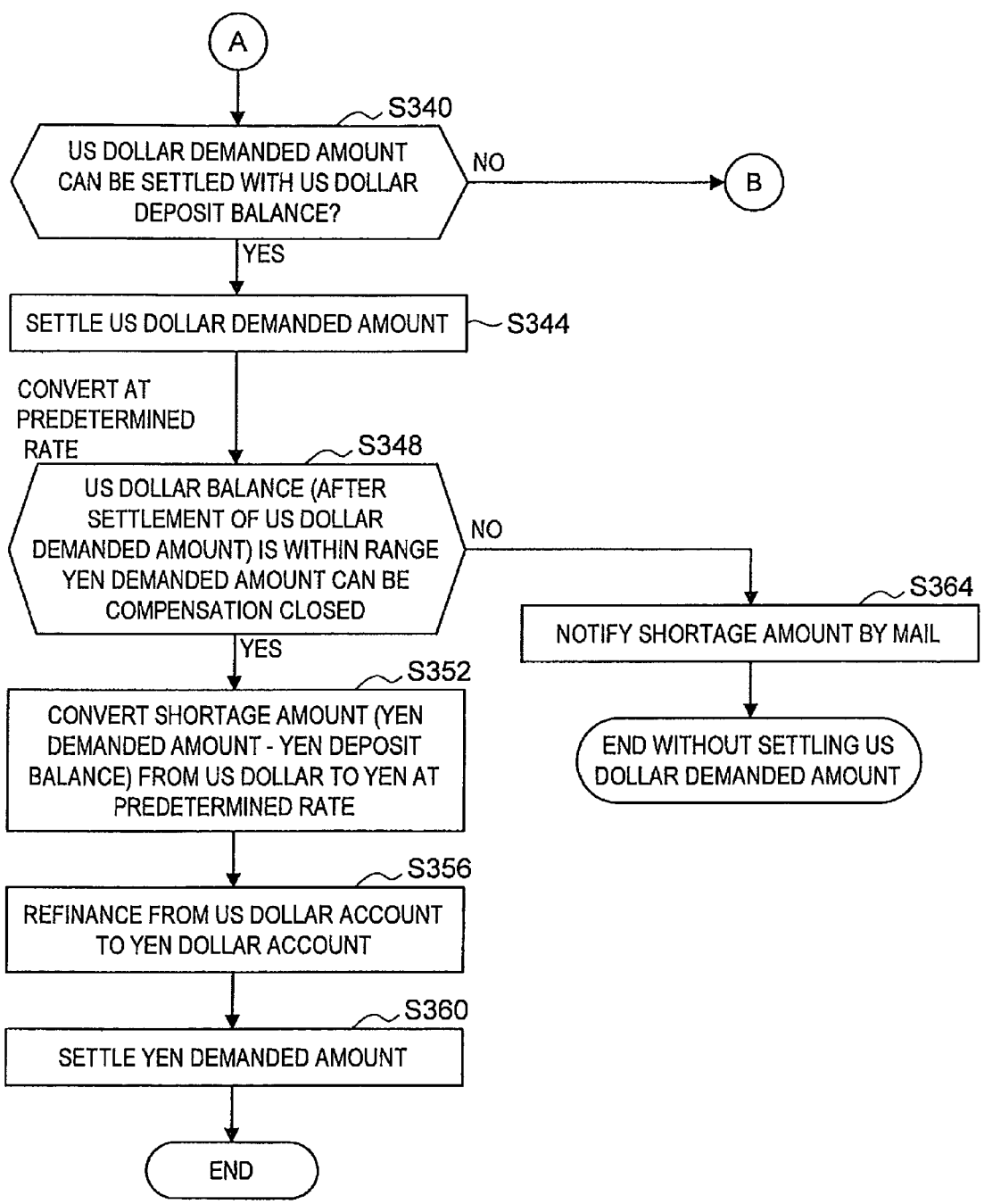
FIG. 12 is a flowchart showing the flow of the settlement process of the bank server according to the first embodiment.
Figure 13:
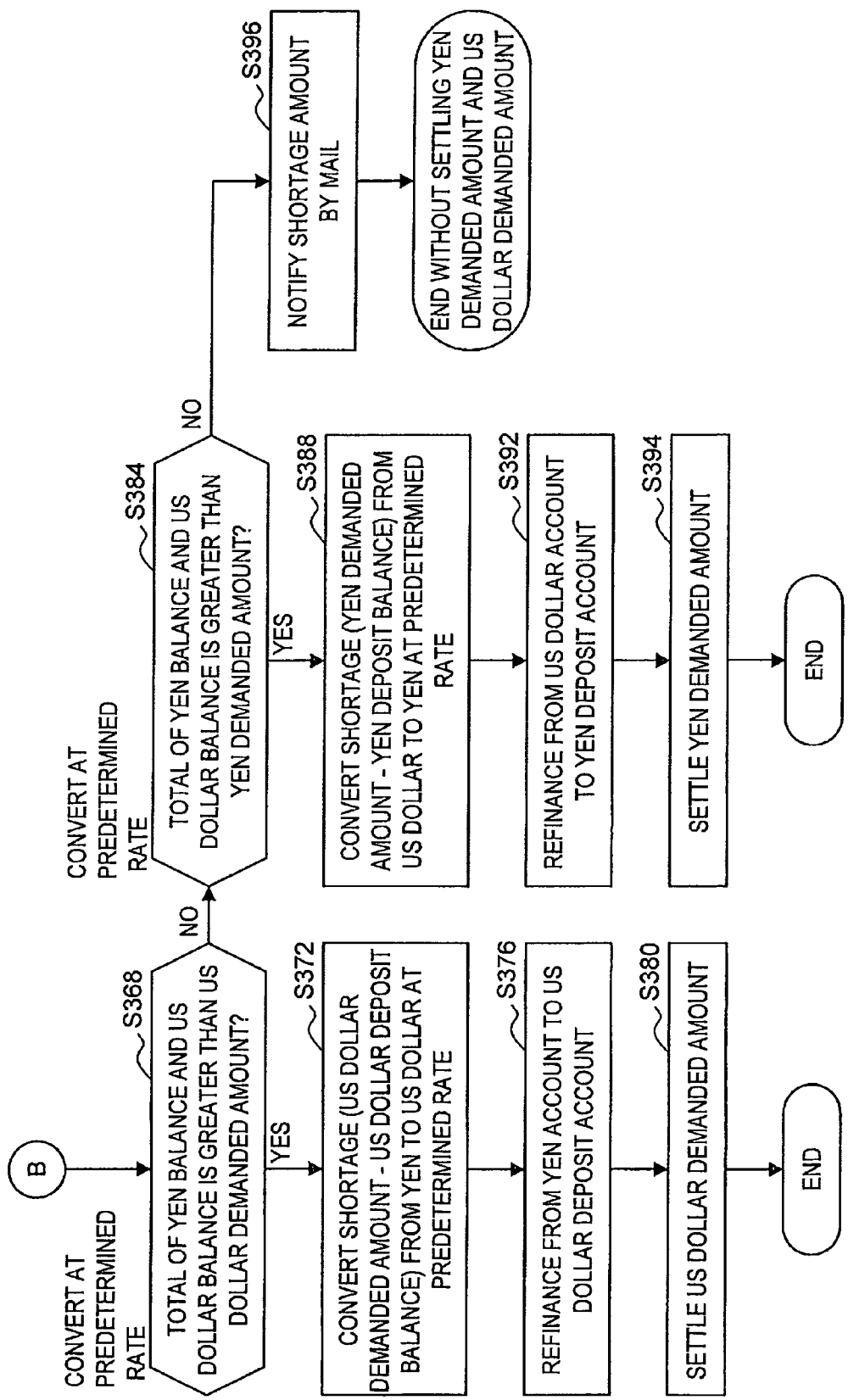
FIG. 13 is a flowchart showing the flow of the settlement process of the bank server according to the first embodiment.

FIGS. 11 to 13 are flowcharts showing a flow of settlement process of the bank server 20 according to the present embodiment. As shown in FIG. 11, first, the settlement judgment unit 250 judges whether or not the yen demanded amount is within the range of the yen deposit balance (S304). If judged that the yen demanded amount is within the range of the yen deposit balance by the settlement judgment unit 250, the settlement processing unit 260 settles the yen demanded amount with the yen deposit (S308). If judged that the yen demanded amount is outside the range of the yen deposit balance by the settlement judgment unit 250, the bank server 20 proceeds to the process of S340 shown in FIG. 12.

After the settlement by the yen deposit, the settlement judgment unit 250 judges whether or not the US dollar demanded amount is within the range of the US dollar deposit balance (S312). If judged that the US dollar demanded amount is within the range of the US dollar deposit balance by the settlement judgment unit 250, the settlement processing unit 260 settles the US dollar demanded amount with the US dollar deposit (S316).

If judged that the US dollar demanded amount is outside the range of the US dollar deposit balance by the settlement judgment unit 250, the compensation judgment unit 270 judges whether or not the shortage amount of the US dollar deposit balance with respect to the US dollar demanded amount can be compensated with the yen deposit balance after the settlement of the yen demanded amount (S320). The compensation judgment unit 270 judges whether or not the shortage amount can be compensated with the yen deposit balance in view of the currency exchange cost corresponding to the customer stage. If judged that the shortage amount can be compensated with the yen deposit balance by the compensation judgment unit 270, the settlement processing unit 260 converts the shortage amount from yen to US dollar at a predetermined rate (S324).

Thereafter, the settlement processing unit 260 deposits the US dollar after conversion to the US dollar savings account (S328), and settles the US dollar demanded amount with the US dollar deposit after the deposit (S332). If judged that the shortage amount may not be compensated with the yen deposit balance by the compensation judgment unit 270 (S320), the bank server 20 notifies the shortage amount to the customer terminal 10 by mail etc. (S336).

If judged that the yen demanded amount is outside the range of the yen deposit balance by the settlement judgment unit 250 in S304, the settlement judgment unit 250 judges whether or not the US dollar demanded amount is within the range of the US dollar deposit balance, as shown in FIG. 12 (S340). If judged that the US dollar demanded amount is within the range of the US dollar deposit balance by the settlement judgment unit 250, the settlement processing unit 260 settles the US dollar demanded amount with the US dollar deposit (S344). If judged that the US dollar demanded amount is outside the range of the US dollar deposit balance by the settlement judgment unit 250, the bank server 20 proceeds to the process of S368 of FIG. 13.

Thereafter, the compensation judgment unit 270 judges whether or not the shortage amount of the yen deposit balance with respect to the yen demanded amount can be compensated with the US dollar deposit balance after the settlement of the US dollar demanded amount (S348). Here, the compensation judgment unit 270 judges whether or not the shortage amount can be compensated with the US dollar deposit balance in view of the currency exchange cost corresponding to the customer stage. If judged that the shortage amount can be compensated with the US dollar deposit balance by the compensation judgment unit 270, the settlement processing unit 260 converts the shortage amount from US dollar to yen at a predetermined rate (S352).

Thereafter, the settlement processing unit 260 deposits the yen after conversion to the yen savings account (S356), and settles the yen demanded amount with the yen deposit after the deposit (S360). If judged that the shortage amount may not be compensated with the US dollar deposit balance by the compensation judgment unit 270 (S356), the bank server 20 notifies the shortage amount to the customer terminal 10 by mail etc. (S364).

If judged that the US dollar demanded amount is outside the range of the US dollar deposit balance by the settlement judgment unit 250 in S340, the compensation judgment unit 270 judges whether or not the total amount of the yen balance and the US dollar balance is greater than the US dollar demanded amount, as shown in FIG. 13 (S368). If judged that the total amount is greater than the shortage amount by the compensation judgment unit 270, the settlement processing unit 260 converts the shortage amount from yen to US dollar at a predetermined rate (S372). Thereafter, the settlement processing unit 260 deposits the US dollar after the conversion to the US dollar savings account (S376), and settles the US dollar demanded amount with the US dollar deposit after the deposit (S380).

If judged that the total amount is smaller than the shortage amount by the compensation judgment unit 270 in S368, the compensation judgment unit judges whether or not the total amount of the yen balance and the US dollar balance is greater than the yen demanded amount (S384). If judged that the total amount is greater than the shortage amount by the compensation judgment unit 270, the settlement processing unit 260 converts the shortage amount from US dollar to yen at a predetermined rate (S388).

Thereafter, the settlement processing unit 260 deposits the yen after the conversion to the yen savings account (S392), and settles the yen demanded amount with the yen deposit after the deposit (S394). If judged that the total amount is greater than the shortage amount by the compensation judgment unit 270 (S384), the bank server 20 notifies the shortage amount to the customer terminal 10 by mail etc. (S396). The process is terminated with the yen demanded amount and the US dollar demanded amount not settled. As described above, a case where the US dollar is not settled although the yen deposit balance has available range can be suppressed by preferentially settling the US dollar. As a result, an event where the customer suffers from unexpected damage due to drastic fluctuation in the exchange rate can be prevented. For instance, a case where the yen drops sharply while the US dollar is being handled as not settled, and the customer is forced a great amount of payment can be prevented.

In the above description, an example where the customer has a yen savings account for the home currency, has a US dollar savings account for the foreign currency, and the US dollar demanded amount related to the foreign currency is preferentially settled has been described, but the present embodiment is not limited to such example. For instance, in a case where a customer living in the United States has a US dollar savings account for the home currency, and has a yen savings account, for example, for the foreign currency savings account, the bank server 20 may preferentially settle the yen demanded amount related to the foreign currency. Furthermore, in a case where a customer living in Europe has a euro savings account for the home currency, and has a US dollar savings account, for example, for the foreign currency savings account, the bank server 20 may preferentially settle the US dollar demanded amount related to the foreign currency. Moreover, a case where the currency used in the country the customer lives in corresponds to the home currency has been described above, but the currency used in the country the bank server 20 is positioned may be handled as the home currency.

[3] Regarding Bank Server According to Second Embodiment

The bank server 20 according to the first embodiment has been described with reference to FIGS. 2 to 13. The bank server 20 according to the first embodiment alleviated the issue of the customer being forced to bear unexpected burden due to shortage in foreign currency deposit balance with respect to the customer having the home currency and the foreign currency savings accounts.

However, although the bank server 20 according to the first embodiment can respond to a case where the customer has savings account for two types of currencies, the customer may have savings accounts for three or more types of currencies. A bank server 21 according to the second embodiment of the present invention is contrived focusing on such situation. According to the bank server 21 of the second embodiment, a case where the customer has three or more types of currency accounts can be responded. The bank server 21 according to the second embodiment will be described below.

[3-1] Function of Bank Server According to Second Embodiment

Figure 14:
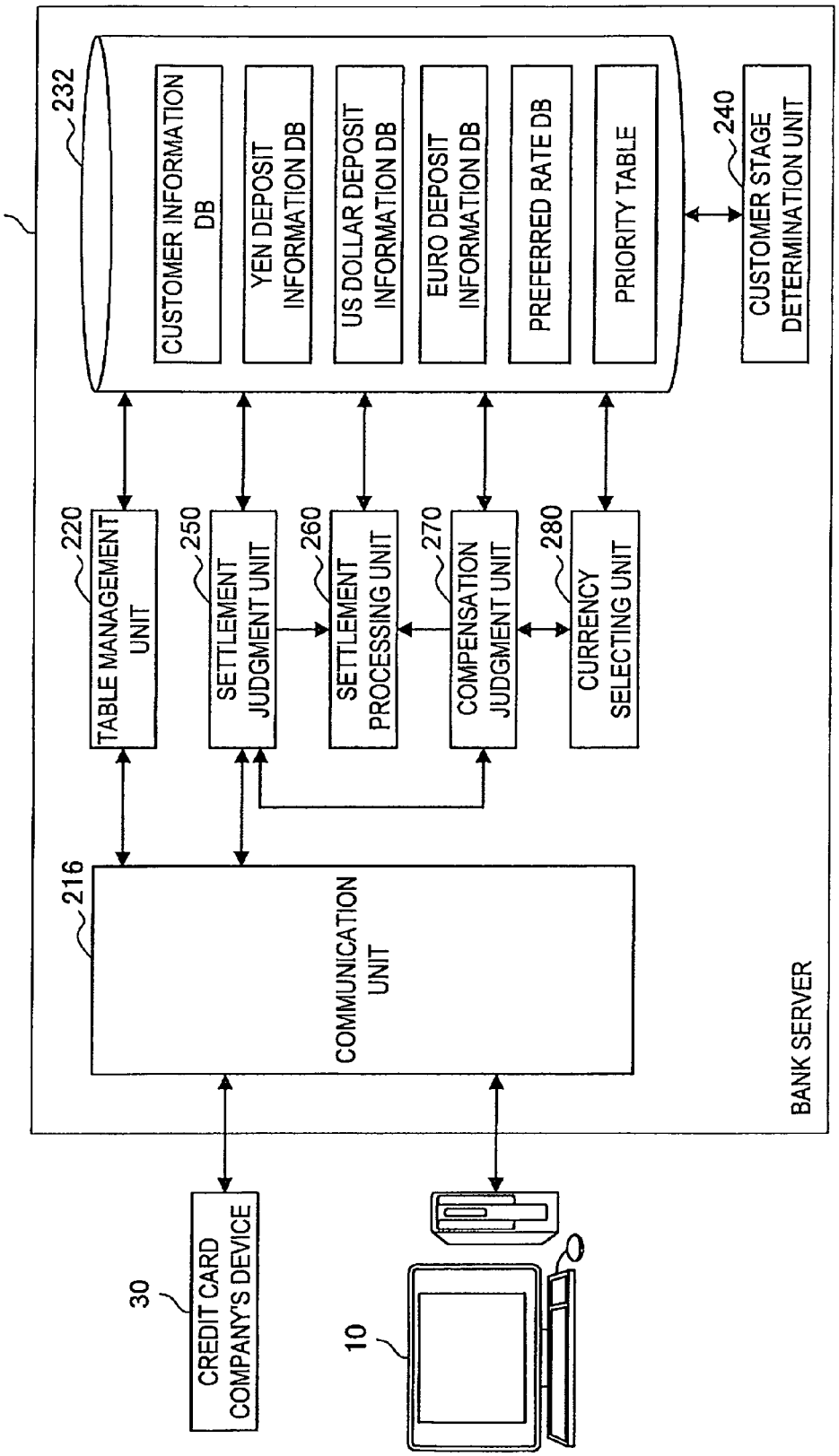
FIG. 14 is a function block diagram showing a configuration of a bank server 21 according to a second embodiment.

FIG. 14 is a function block diagram showing a configuration of the bank server 21 according to the second embodiment. As shown in FIG. 14, the bank server 21 according to the present embodiment includes the communication unit 216, the table management unit 220, a storage unit 232, the customer stage determination unit 240, the settlement judgment unit 250, the settlement processing unit 260, a compensation judgment unit 272, and a currency selecting unit 280. The functions of the communication unit 216, the table management unit 220, and the customer stage determination unit 240 are substantially the same as the functions described in the first embodiment, and thus the configuration different in function from the first embodiment will be centrally described below.

As shown in FIG. 14, in the present embodiment, the storage unit 232 stores a plurality of foreign currency deposit information DBs. Specifically, the storage unit 232 stores the US dollar deposit information DB and the euro deposit information DB. The US dollar deposit information DB and the euro deposit information DB include a deposit table for managing the ordinary deposit balance, the fixed deposit balance and the like for every customer.

Furthermore, the storage unit 232 stores a priority table. As shown in FIG. 15, the priority table includes a settlement currency priority table and a compensation currency priority table.

FIG. 15 is an explanatory view showing a specific example of the settlement currency priority table (first priority data) and the compensation currency priority table (second priority data). The settlement currency priority table is a table showing which currency to preferentially settle of the currencies that may not be settled without compensation. In the example shown in FIG. 15, the settlement priority is set in the order of US dollar, euro, and yen.

The compensation currency priority table is a table showing from which currency to preferentially compensate with respect to the currencies that may not be settled without compensation. In the example shown in FIG. 15, the compensation priority is set in the order of yen, US dollar, and euro.

The currency selecting unit 280 shown in FIG. 14 has a function serving as a selecting unit for selecting the currency to be settled with reference to the settlement currency priority table, and selecting the compensation source currency with reference to the compensation currency priority table. For instance, the currency selecting unit 280 selects in order from the currency set with the highest priority in the settlement currency priority table of the currencies judged that the demanded amount is outside the range of the deposit balance. The currency selecting unit 280 selects in order from the currency set with the highest priority in the compensation currency priority table.

The compensation judgment unit 272 judges whether or not the shortage amount with respect to the deposit balance of the demanded amount of the currency to be settled selected by the currency selecting unit 280 is within the range of the deposit balance of the compensation source currency selected by the currency selecting unit 280. The compensation judgment unit 272 may judge whether or not the demanded amount of the currency to be settled selected by the currency selecting unit 280 is within the range of the total value of the deposit balance of the currency to be settled and the deposit balance of the compensation source currency.

If judged that the shortage amount is within the range of the deposit balance of the compensation source currency selected by the currency selecting unit 280, the settlement processing unit 260 compensates the shortage amount from the deposit balance of the compensation source currency and makes the settlement. If judged that the shortage amount is outside the range of the deposit balance of the compensation source currency selected by the currency selecting unit 280, the currency selecting unit 280 then selects the compensation source currency of the next highest priority. The compensation judgment unit 272 then judges whether or not the shortage amount is within the range of the total value of the deposit balances of the compensation source currencies selected by the currency selecting unit 280 up to now. If judged that the shortage amount is within the range of the total value of the deposit balances of the compensation source currencies selected by the currency selecting unit 280 up to now, the settlement processing unit 260 compensates the shortage amount from the deposit balances of the compensation source currencies selected by the currency selecting unit 280 up to now and makes the settlement.

A specific example of the settlement according to the present embodiment will be described with reference to FIG. 16. FIG. 16 shows a specific example of a case where the bank server 21 operates according to the priority table shown in FIG. 15, one US dollar is 100 yen, one euro is 150 yen, and one euro is 1.5 US dollars. In the description of FIG. 16, currency exchange cost is assumed to not arise for the sake of convenience of the explanation.

FIG. 16A shows a settlement case of when a request is made to transfer 2,750,000 yen to the specified account of the credit card company with respect to the customer having a yen deposit of 1,000,000 yen, a US dollar deposit of 10,000 US dollars, and a euro deposit of 10,000 euro. In this case, the settlement judgment unit 250 judges that the yen demanded amount is outside the range of the yen deposit balance.

Thereafter, the currency selecting unit 280 references the compensation currency priority table, and selects US dollar as the compensation source currency. However, since the yen demanded amount is outside the range of the total amount of the yen deposit balance and the US dollar deposit balance, the compensation judgment unit 272 judges that the yen demanded amount may not be settled with only compensation from the US dollar deposit.

Thus, the currency selecting unit 280 references the compensation currency priority table, and further selects euro for the compensation source currency. The compensation judgment unit 272 judges that the yen demanded amount can be settled by compensation from the US dollar deposit and the euro deposit since the yen demanded amount is within the range of the total amount of the yen deposit balance, the US dollar deposit balance, and the euro deposit balance.

In response to the judgment by the compensation judgment unit 272, the settlement processing unit 260 converts 10,000 US dollars to yen and deposits to the yen deposit, converts 5,000 euro to yen and deposits to the yen deposit, and settles the yen demanded amount from the yen deposit after the deposit. As a result, the yen deposit balance becomes 0 yen, the US dollar deposit balance becomes 0 yen, and the euro deposit balance becomes 5,000 euro.

FIG. 16B shows a settlement case of when a request is made to transfer 24,500 US dollars and 15,000 euro with respect to the customer having a yen deposit of 1,000,000 yen, a US dollar deposit of 10,000 US dollars, and a euro deposit of 10,000 euro. In this case, the settlement judgment unit 250 judges that the US dollar demanded amount is outside the range of the US dollar deposit balance, and that the euro demanded amount is outside the range of the euro deposit balance.

Thereafter, the currency selecting unit 280 references the settlement currency priority table, and selects US dollar as the currency to be settled. The currency selecting unit 280 also references the compensation currency priority table, and selects yen as the compensation source currency. However, since the US dollar demanded amount is outside the range of the total amount of the yen deposit balance and the US dollar deposit balance, the compensation judgment unit 272 judges that the US dollar demanded amount may not be settled with only compensation from the yen deposit.

Thus, the currency selecting unit 280 references the compensation currency priority table, and further selects euro for the compensation source currency. The compensation judgment unit 272 judges that the US dollar demanded amount can be settled by compensation from the yen deposit and the euro deposit since the US dollar demanded amount is within the range of the total amount of the yen deposit balance, the US dollar deposit balance, and the euro deposit balance.

In response to the judgment by the compensation judgment unit 272, the settlement processing unit 260 converts 1,000,000 yen to US dollars and deposits to the US dollar deposit, and converts 3,000 euro to US dollars and deposits to the US dollar deposit, and settles the US dollar demanded amount from the US dollar deposit after the deposit. As a result, the yen deposit balance becomes 0 yen, the US dollar deposit balance becomes 0 yen, and the euro deposit balance becomes 7,000 euro.

Thereafter, the currency selecting unit 280 references the settlement priority table and selects euro as the currency to be settled. The currency selecting unit 280 references the compensation currency priority table and selects yen as the compensation source currency. However, since the euro demanded amount is outside the range of the total amount of the yen deposit balance and the euro deposit balance, the compensation judgment unit 272 judges that the euro demanded amount may not be settled with only compensation from the yen deposit. Therefore, the currency selecting unit 280 references the compensation currency priority table, and further selects US dollar for the compensation source currency. However, the compensation judgment unit 272 judges that the euro demanded amount may not be settled by compensation from the yen deposit and the US dollar deposit since the euro demanded amount is outside the range of the total amount of the yen deposit balance, the US dollar deposit balance, and the euro deposit balance. As a result, the euro demanded amount is handled as not settled.

FIG. 16C shows a settlement case of when a request is made to transfer 500,000 yen and 19,500 US dollars with respect to the customer having a yen deposit of 1,000,000 yen, a US dollar deposit of 10,000 US dollars, and a euro deposit of 10,000 euro. In this case, the settlement judgment unit 250 judges that the yen demanded amount is within the range of the yen deposit balance, and that the US dollar demanded amount is outside the range of the US dollar deposit balance. Therefore, the settlement processing unit 260 settles the yen demanded amount with the yen deposit. As a result, the yen deposit balance becomes 500,000 yen.

Thereafter, the currency selecting unit 280 references the compensation currency priority table, and selects yen as the compensation source currency to settle the US dollar demanded amount that is not settled. However, since the US dollar demanded amount is outside the range of the total amount of the yen deposit balance and the US dollar deposit balance, the compensation judgment unit 272 judges that the US dollar demanded amount may not be settled with only compensation from the yen deposit.

Thus, the currency selecting unit 280 references the compensation currency priority table, and further selects euro as the compensation source currency. The compensation judgment unit 272 judges that the US dollar demanded amount can be settled by compensation from the yen deposit and the euro deposit since the US dollar demanded amount is within the range of the total amount of the yen deposit balance, the US dollar deposit balance, and the euro deposit balance.

In response to the judgment by the compensation judgment unit 272, the settlement processing unit 260 converts 500,000 yen to US dollars and deposits to the US dollar deposit, and converts 3,000 euro to US dollars and deposits to the US dollar deposit, and settles the US dollar demanded amount from the US dollar deposit after the deposit. As a result, the yen deposit balance becomes 0 yen, the US dollar deposit balance becomes 0 yen, and the euro deposit balance becomes 7,000 euro.

[3-2] Operation of Bank Server According to Second Embodiment

The functions of the bank server 21 according to the present embodiment have been described with reference to FIGS. 14 to 16. The operation of the bank server 21 according to the present embodiment will now be described with reference to FIG. 17.

Figure 17:
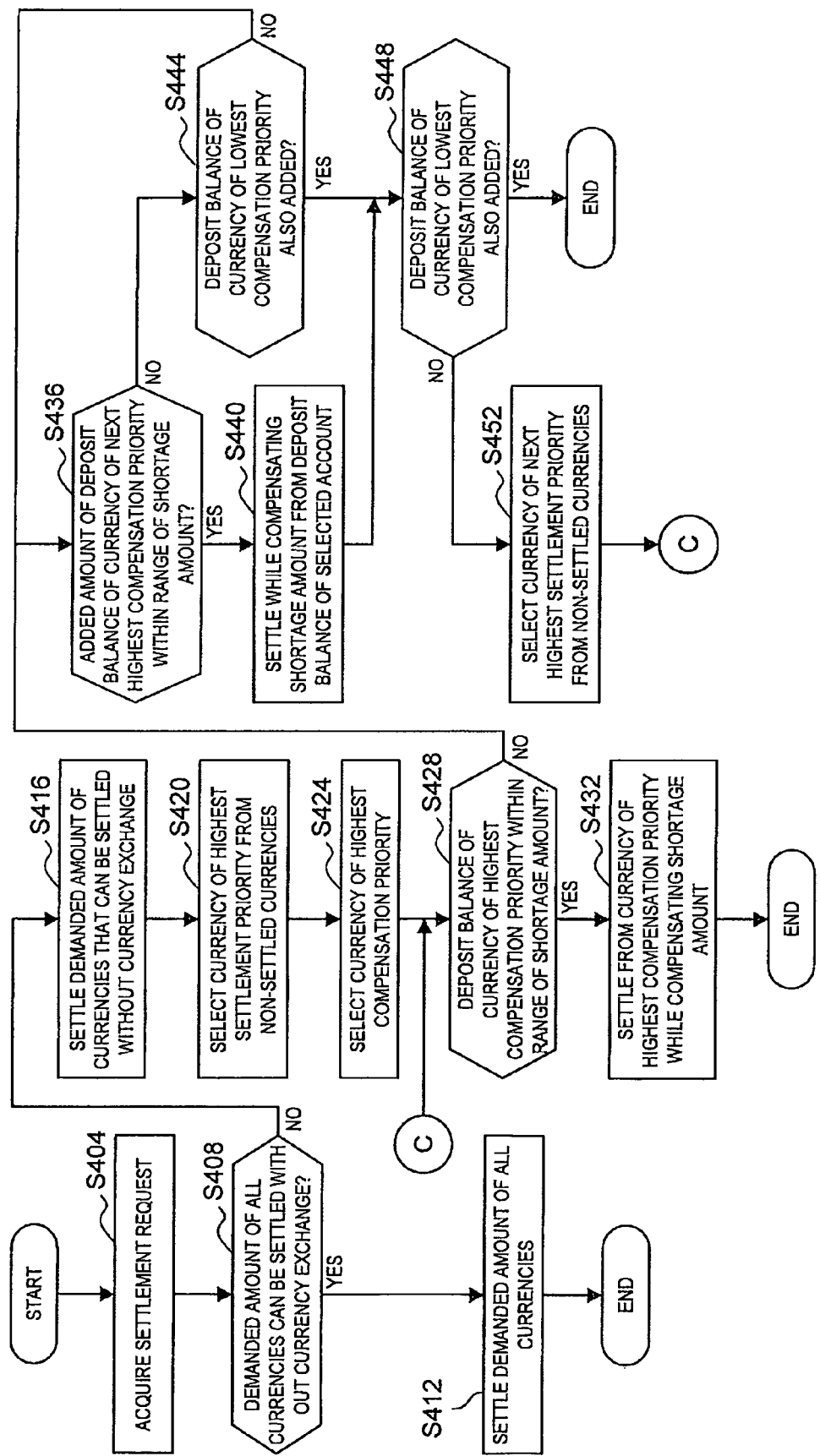
FIG. 17 is a flowchart showing a flow of operation of the bank server according to the second embodiment.

FIG. 17 is a flowchart showing a flow of operation of the bank server 21 according to the second embodiment. As shown in FIG. 17, when the bank server 21 acquires a settlement request from the credit card company's device 30 (S404), the settlement judgment unit 250 judges whether or not the demanded amount of all currencies can be settled without conversion (S408). If judged that the demanded amount of all currencies can be settled by the settlement judgment unit 250, the settlement processing unit 260 settles the demanded amount of all currencies (S412).

If judged that the demanded amount of at least one part of the currency may not be settled by the settlement judgment unit 250 (S408), the settlement processing unit 260 settles the demanded amount of the currency that can be settled without conversion (S416). Thereafter, the currency selecting unit 280 selects the currency with the highest settlement priority from the non-settled currencies with reference to the settlement currency priority table (S420). Furthermore, the currency selecting unit 280 selects the currency with the highest compensation priority with reference to the compensation currency priority table (S424).

Thereafter, the compensation judgment unit 272 judges whether or not the deposit balance of the currency selected by the currency selecting unit 280 is within the range of the shortage amount of the deposit balance of the currency to be settled with respect to the demanded amount of the currency to be settled (S428). Here, the compensation judgment unit 272 judges whether or not the shortage amount of the deposit balance of the currency to be settled can be compensated in view of the currency exchange cost corresponding to the customer stage. If judged that the deposit balance of the currency selected by the currency selecting unit 280 is within the range of the shortage amount, the settlement processing unit 260 compensates the shortage amount at a predetermined rate from the deposit of the currency selected by the currency selecting unit 280, and settles the demanded amount of the currency to be settled (S432).

If judged that the deposit balance of the currency selected by the currency selecting unit 280 is outside the range of the shortage amount, the currency selecting unit 280 references the compensation currency priority table and selects the currency with the next highest compensation priority. The compensation judgment unit 272 judges whether or not the total amount of the deposit balances of the currency with the highest compensation priority and the currency with the next highest compensation priority is within the range of the shortage amount (S436). The compensation judgment unit 272 judges whether or not the total amount is within the range of the shortage amount of the deposit balance of the currency to be settled in view of the currency exchange cost corresponding to the customer stage. If judged that the total amount is within the range of the shortage amount, the settlement processing unit 260 settles the demanded amount of the currency to be settled by compensating the shortage amount at a predetermined rate from the deposit of the currency selected by the currency selecting unit 280 (S440). If judged that the total amount is outside the range of the shortage amount and a currency of low compensation priority exists, the deposit balance of the relevant currency is added to the total amount, and the process of S436 is performed.

After S440, or when the deposit balance of the currency of lowest compensation priority is added (S444), the currency selecting unit 280 judges whether or not the compensation judgment related to the demanded amount of all non-settled currencies is terminated (S448) If the non-settled currency not performed with the compensation judgment related to the demanded amount exists, the currency selecting unit 280 references the settlement currency priority table, selects the currency of next highest settlement priority from the non-settled currencies, and proceeds to S428 (S452). If the non-settled currency not performed with the compensation judgment related to the demanded amount does not exist, the series of settlement process is terminated.

[4] Conclusion

As described above, in the first embodiment of the present invention, when the usage demanded amount related to yen and US dollar are outside the respective deposit balance, whether or not the shortage amount of the US dollar deposit balance with respect to the US dollar usage demanded amount can be compensated from the yen deposit is judged as the first stage. If compensation is possible from the yen deposit, the shortage amount is compensated from the yen deposit to settle the US dollar usage demanded amount. Furthermore, as a second stage, whether or not the shortage amount of the yen deposit balance with respect to the yen usage demanded amount can be compensated from the US dollar deposit is judged, where if compensation is possible, the shortage amount of the yen deposit balance is compensated form the US dollar deposit to settle the yen usage demanded amount. A case where the usage demanded amount related to US dollar is not settled can be suppressed by preferentially settling the US dollar in such manner. As a result, the issue of forcing unexpected burden on the customer due to shortage in the US dollar deposit balance such as arise of late charge of the settlement can be alleviated.

In the second embodiment of the present invention, a case where the customer has three types of currencies can be responded by using the settlement currency priority table and the compensation currency priority table. Increase in the type of currency can be responded by simply adding a new currency and the priority of the currency to the settlement currency priority table and the compensation currency priority table, and thus expandability is satisfactory.

It should be understood by those skilled in the art that various modifications, combinations, sub-combinations and alterations may occur depending on design requirements and other factors insofar as they are within the scope of the appended claims or the equivalents thereof.

For instance, each step in the process of the bank server 20 and the bank server 21 of the present specification may not be performed in time-series in the order described in the flowchart. Each step in the process of the bank server 20 and the bank server 21 may include processes executed in parallel or individually (e.g., parallel process or process by object).

A computer program for causing the hardware such as the CPU 201, the ROM 202, and the RAM 203 incorporated in the bank server 20 and the bank server 21 to exhibit functions same as each configuration of the bank server 20 and the bank server 20 described above may be created. A storage medium stored with such computer program is also provided. The series of processes can be realized by hardware by configuring the function blocks shown in the function block diagram of FIG. 3 or FIG. 14 by hardware.

What is claimed is:

1. A withdrawal processing apparatus comprising:

A processing unit for controlling operation of the apparatus;

a storage unit that stores a deposit balance for every account of a plurality of types of currencies and first priority data and second priority data indicating priority of the plurality of types of currencies;

an acquiring unit that acquires withdrawal request information including a withdrawal amount of every currency;

a withdrawal judgment unit that judges, for every currency, whether or not the withdrawal amount in the withdrawal request information is within a range of a deposit balance of an account of every currency;

a withdrawal processing unit that performs a withdrawal process based on the withdrawal amount for the account in which the withdrawal amount is judged as within the range of the deposit balance by the withdrawal judgment unit;

a selecting unit that selects a currency with highest priority according to the first priority data of the currencies in which the withdrawal amount is judged as outside the range of the deposit balance by the withdrawal judgment unit; and a compensation judgment unit that judges whether or not a shortage amount with respect to the withdrawal amount of a currency account selected by the selecting unit is within a range of a deposit balance of a currency account selected based on the second priority data, wherein the withdrawal processing unit compensates the shortage amount based on a judgment result of the compensation judgment unit and performs the withdrawal process of the withdrawal amount, the storage unit storing foreign currency fixed deposit information for a customer, foreign currency ordinary deposit information for the customer, and a customer stage for the customer, the customer stage being computed by converting the total of the customer's foreign currency deposits into an amount of another currency and assigning the customer stage based on the amount of another currency, and an exchange cost for the customer being determined according to the customer stage.

2. The withdrawal processing apparatus according to claim 1, wherein the withdrawal processing unit compensates the shortage amount from the currency account of highest priority and performs the withdrawal process if judged by the compensation judgment unit that the shortage amount is within the range of the deposit balance of the currency account with highest priority based on the second priority data.

3. The withdrawal processing apparatus according to claim 1, wherein the compensation judgment unit selects a currency of next highest priority based on the second priority data if judged that the shortage amount is outside the range of the deposit balance of the currency account with the highest priority based on the second priority data, and judges whether or not the shortage amount is within a range of a total amount of the deposit balance of the currency account with the highest priority and the deposit balance of the currency account with the next highest priority, and the withdrawal processing unit compensates the total amount of the deposit balance of the currency account with the highest priority and at least one part of the deposit balance of the currency account with the next highest priority and performs the withdrawal process of the shortage amount if judged by the compensation judgment unit that the shortage amount is within the range of the total amount.

4. The withdrawal processing apparatus according to claim 1, wherein the storage unit stores a currency rate for mutually converting the plurality of types of currencies set based on the total amount of the deposit balance for every account of the plurality of types of currencies for every customer having accounts of the plurality of types of currencies; and the compensation judgment unit reads out from the storage unit the currency rate for converting from a currency selected based on the second priority data to a currency in which the shortage amount arose, and judges whether or not the shortage amount is within the range of the converted currency balance in which the currency rate is applied to the deposit balance of the currency account selected based on the second priority data.

* * * * *